United States Patent [19]
Parfitt

[11] Patent Number: 5,975,228
[45] Date of Patent: Nov. 2, 1999

[54] SPRING ACTUATION SYSTEM FOR VEHICLE HOODS AND CLOSURES

[75] Inventor: Laurence S. Parfitt, Lynnwood, Wash.

[73] Assignee: Paccar Inc, Bellevue, Wash.

[21] Appl. No.: 08/847,061

[22] Filed: Apr. 30, 1997

Related U.S. Application Data

[63] Continuation-in-part of application No. 08/641,478, May 1, 1996, Pat. No. 5,890,556.

[51] Int. Cl.⁶ .................................................. B62D 25/12
[52] U.S. Cl. ......................................................... 180/69.21
[58] Field of Search .............................. 180/69.2, 69.21, 180/89.17; 296/76

[56] References Cited

U.S. PATENT DOCUMENTS

| | | |
|---|---|---|
| 1,598,868 | 9/1926 | Lundelius ............................. 180/69.21 |
| 2,188,335 | 1/1940 | Claud-Mantle . | |
| 3,754,613 | 8/1973 | Stephens et al. ..................... 180/69.21 |
| 4,359,129 | 11/1982 | Kammerman .............................. 49/386 |
| 4,566,552 | 1/1986 | Hoffman et al. ..................... 180/69.21 |
| 4,938,520 | 7/1990 | Shelton ..................................... 296/76 |
| 4,991,675 | 2/1991 | Tosconi et al. ...................... 180/69.21 |
| 5,101,921 | 4/1992 | West et al. ........................... 180/69.21 |
| 5,730,240 | 3/1998 | Hoffman et al. ..................... 180/69.21 |

*Primary Examiner*—F. J. Bartuska
*Attorney, Agent, or Firm*—Wells, St. John, Roberts, Gregory & Matkin, P.S.

[57] ABSTRACT

A hood mounting system and methods having compliant hinge assemblies mounted between frontal portions of a hood and the vehicle frame. A spring actuator is mounted from the frame and hood which exerts force to assist movement of the hood from the open and closed positions. A locking device is operably connected to the spring actuator and is operable in response to movement of the hood to automatically lock the hood in an open position. The locking device is movable to a release position to permit the hood to move from the open hood position to the closed position.

57 Claims, 16 Drawing Sheets

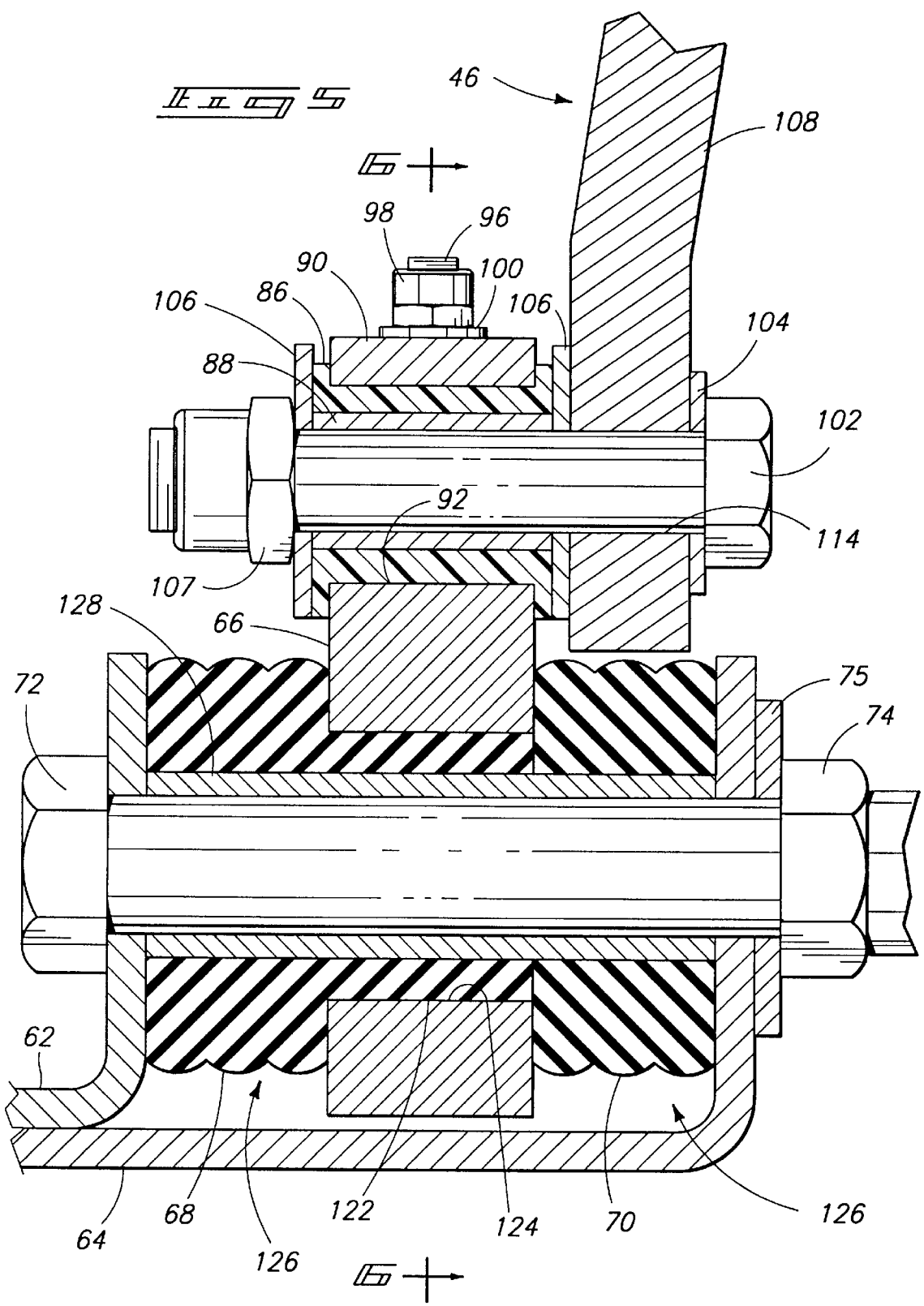

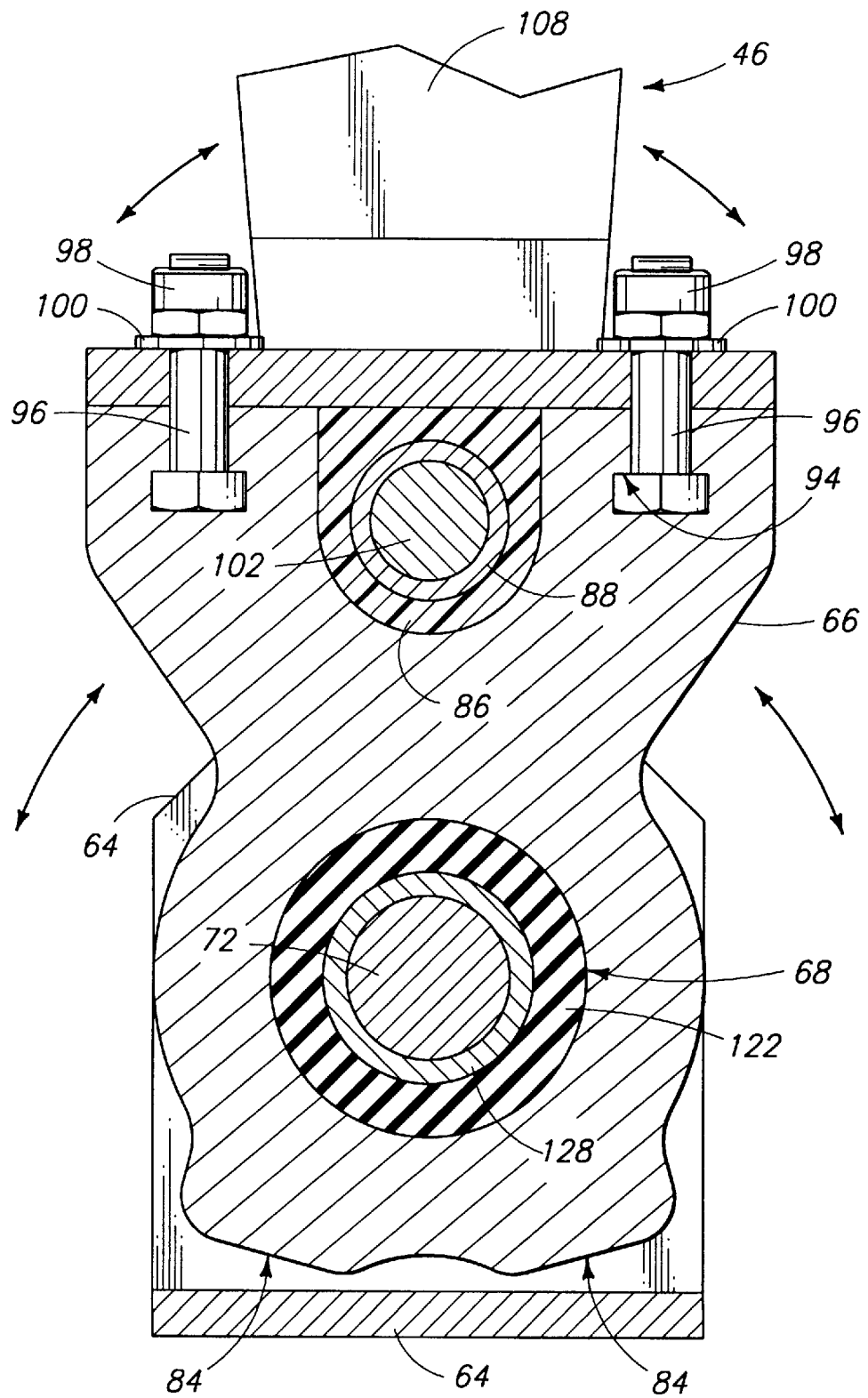

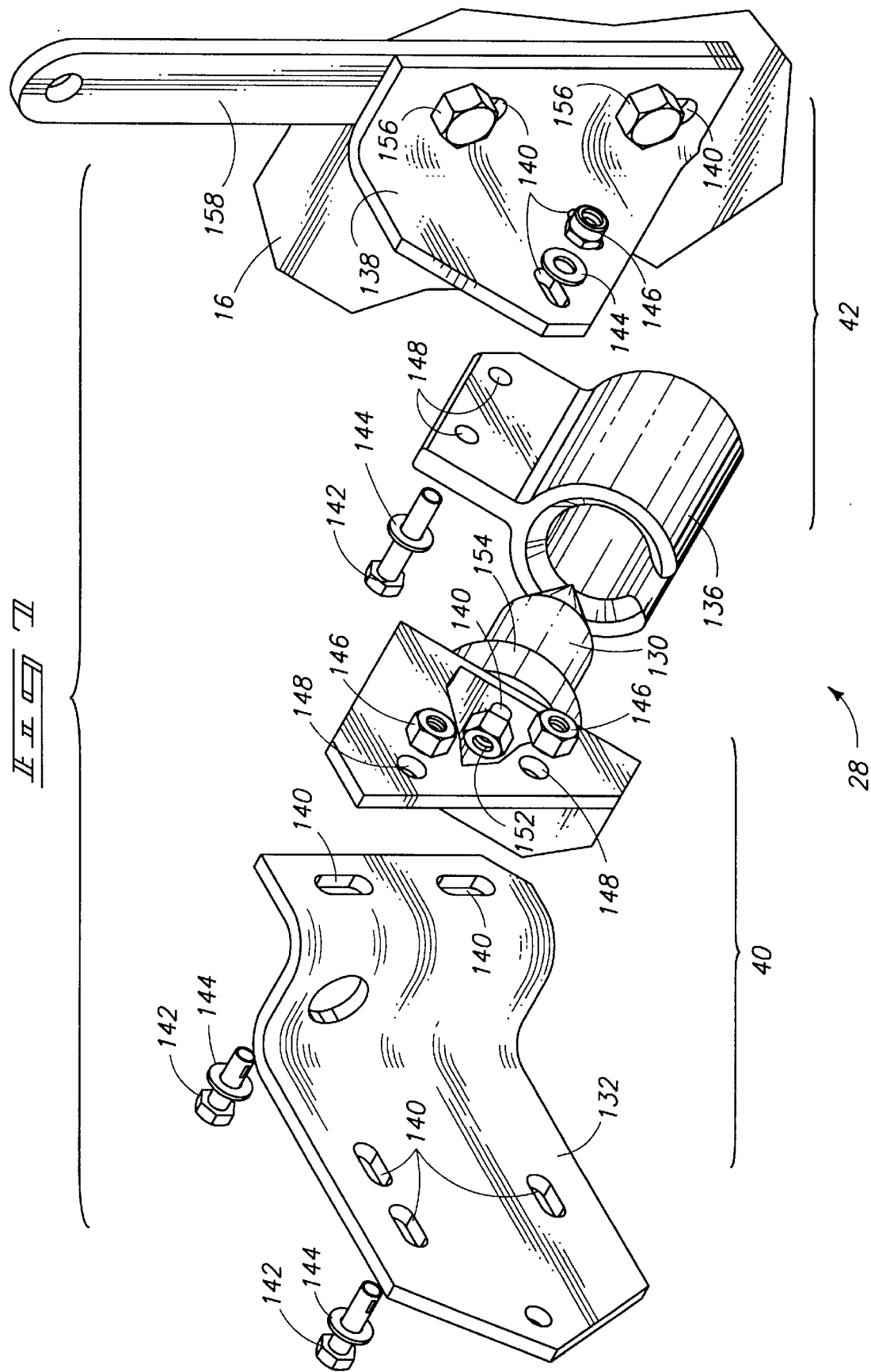

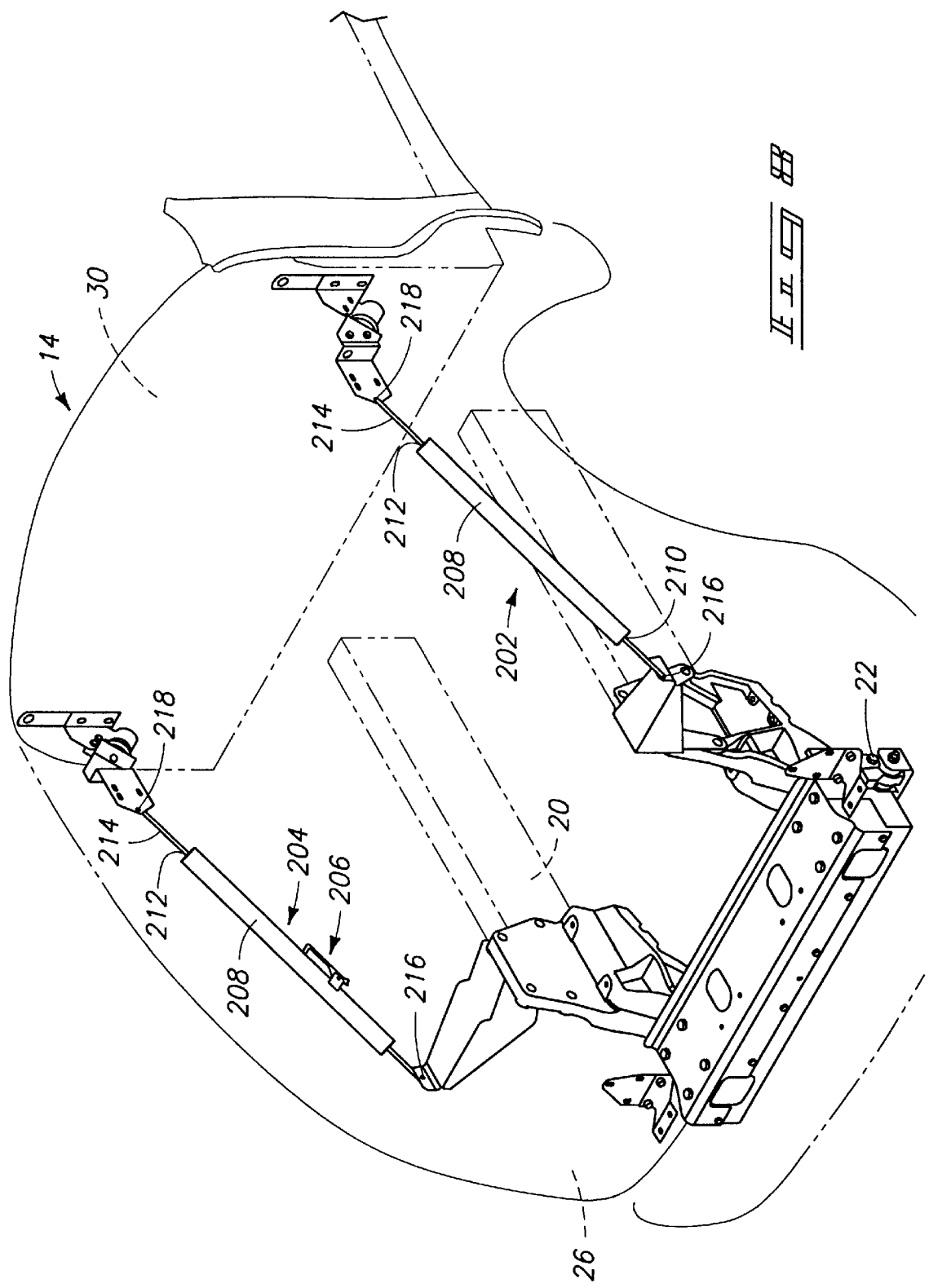

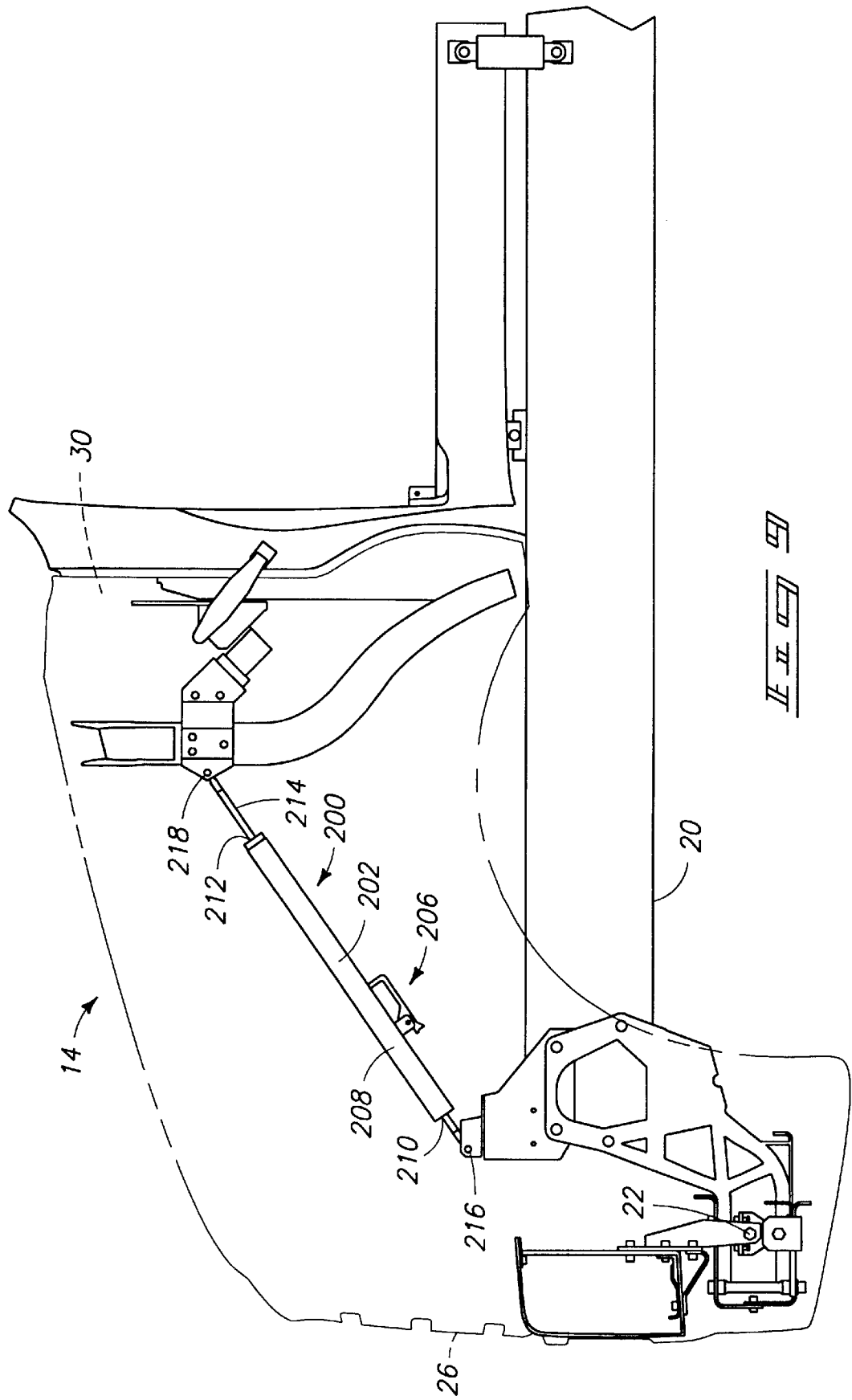

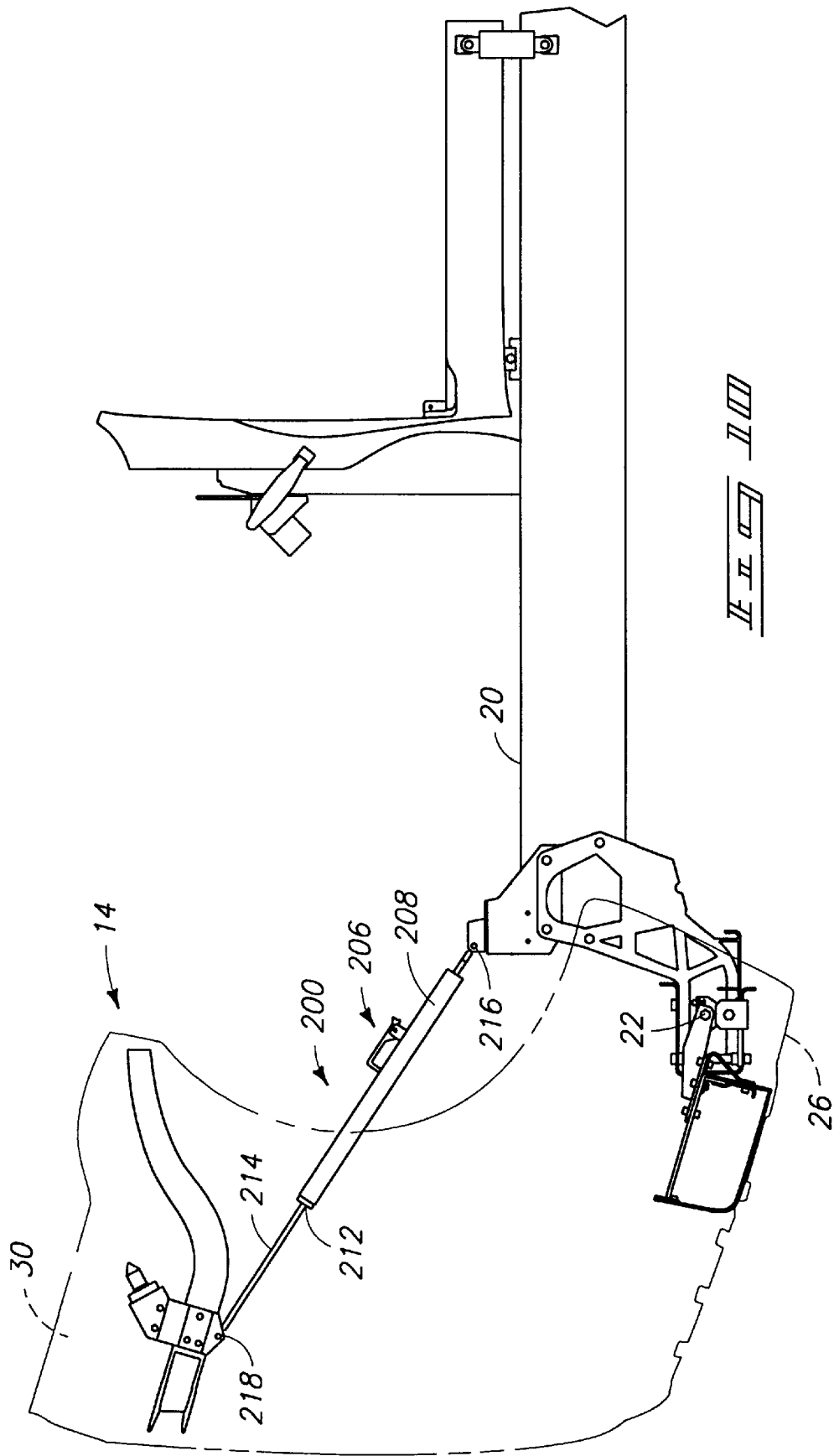

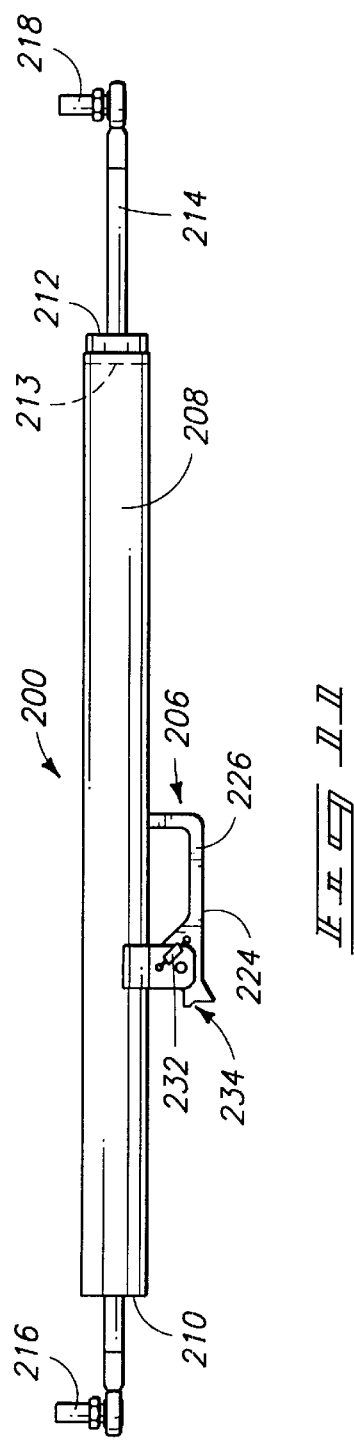

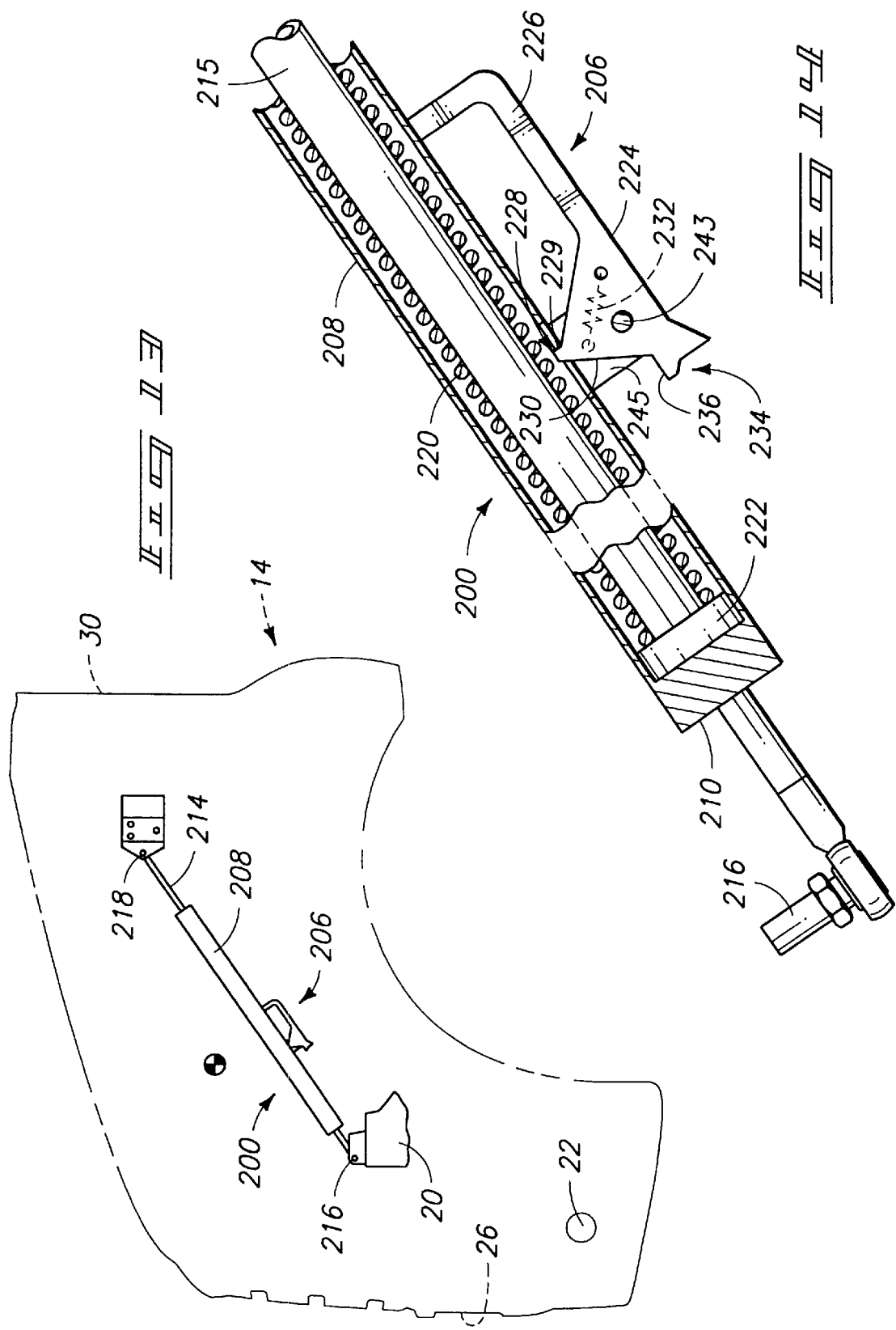

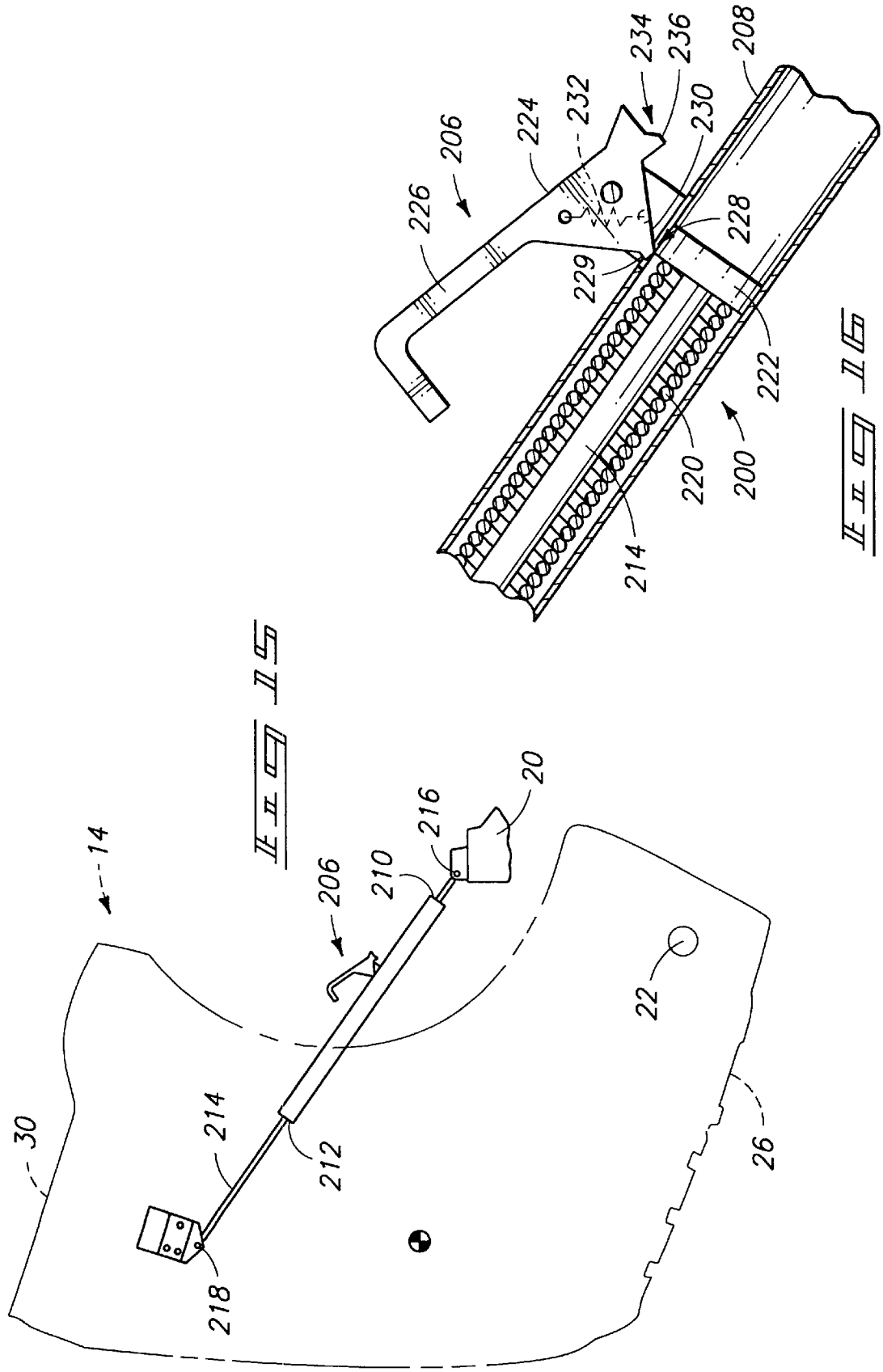

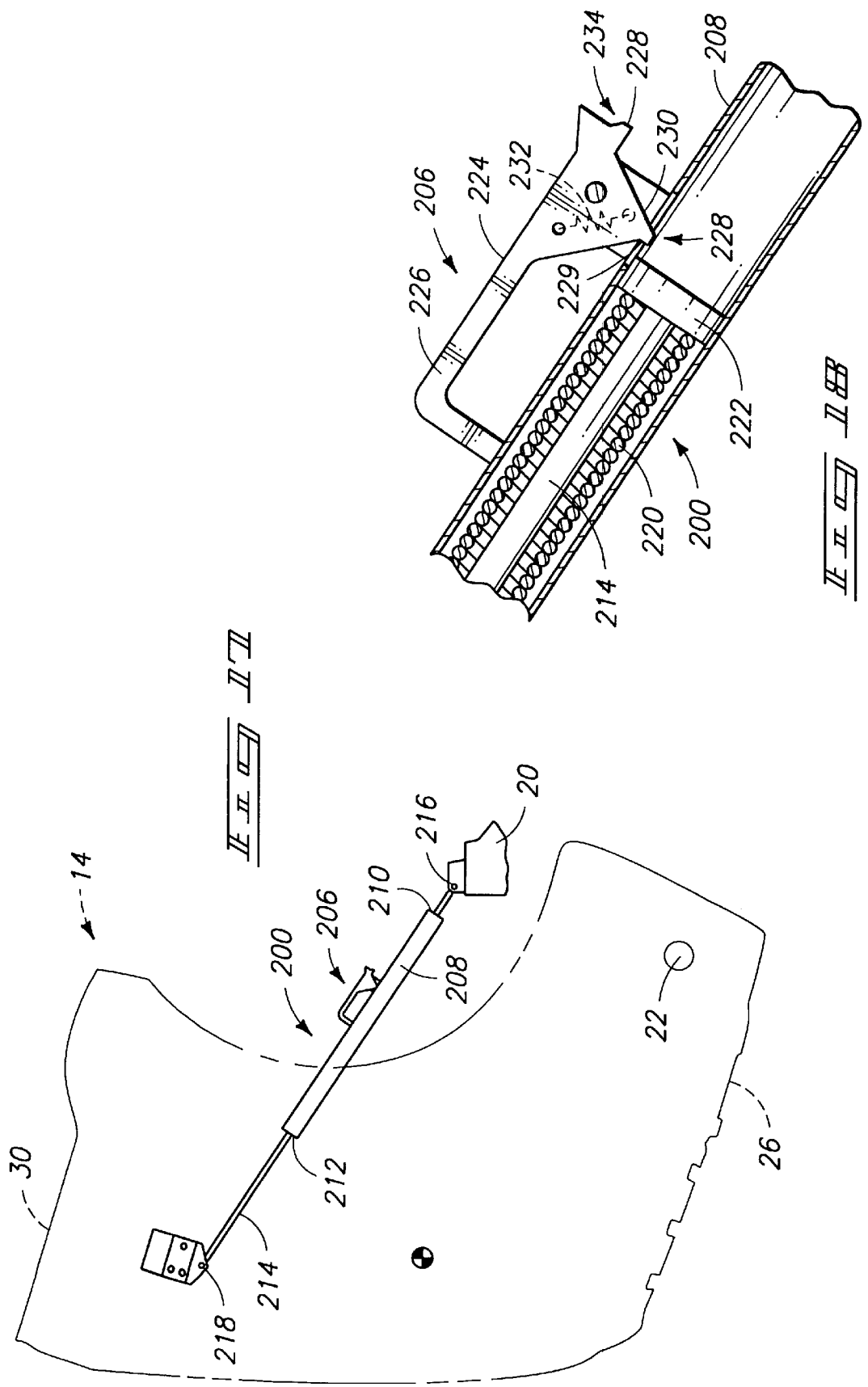

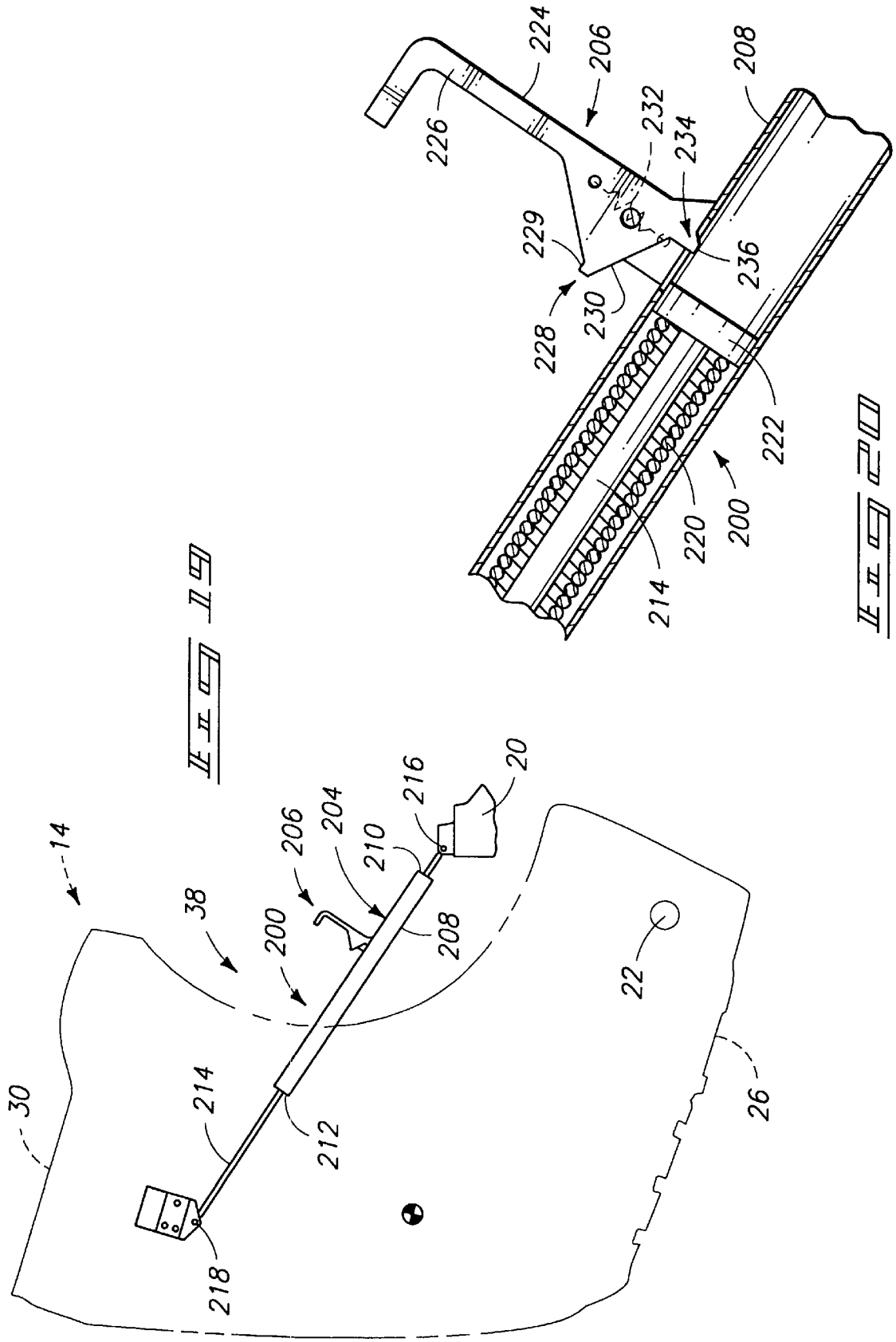

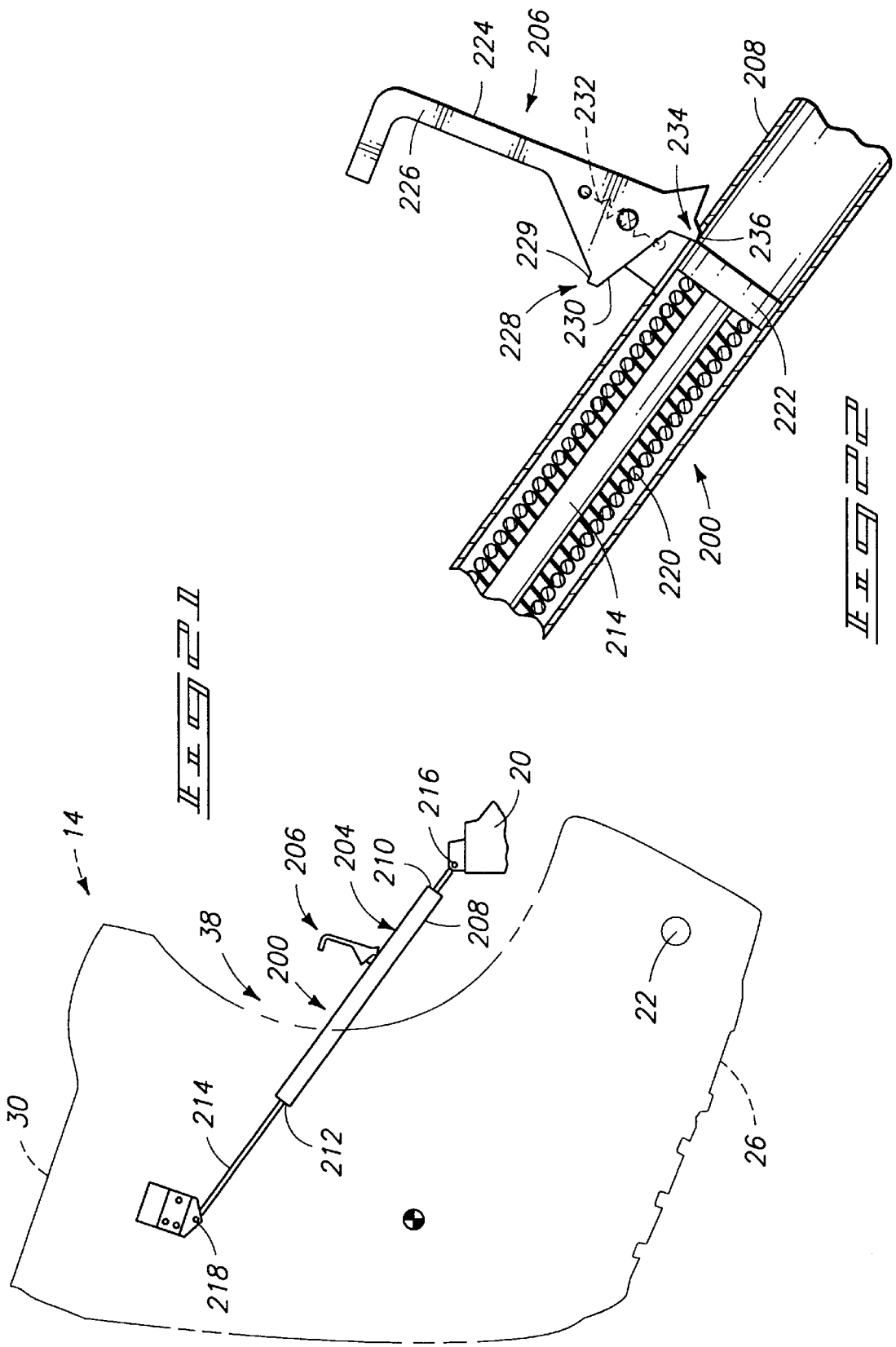

5,975,228

SPRING ACTUATION SYSTEM FOR VEHICLE HOODS AND CLOSURES

RELATED APPLICATIONS

This application is a continution-in-part based upon U.S. patent application Ser. No. 08/641,478, filed May 1, 1996 now U.S. Pat. No. 5,890,556.

TECHNICAL FIELD

This invention relates to vehicle hood mounting systems.

BACKGROUND OF THE INVENTION

One previously known way of mounting a hood to a frame and cab of a truck is to utilize a four-point hood mounting system. Such systems are typically used on class 7 and 8 trucks, resulting in a cab-to-hood gap of approximately 25 mm. Such a large amount of hood-to-cowl spacing is required in order to accommodate up to approximately 22 mm of travel between the cab and frame due to deflection and other factors with a typical fully-loaded chassis.

Air cab suspensions are typically included on modern trucks to produce an improved ride for the driver. Usually, the air cab suspension is mounted at the back of the cab and the cab pivots about a pivot axis near the front of the cab. The pivotal action of the cab occurs with respect to the vehicle frame. Movement of the cab relative to the frame causes the cowl to move fore and aft considerably in response to articulation of the suspension. As a result of this fore-and-aft bucking action, an undesirable, large clearance gap is required between the back edge of the hood and the front edge of the cab.

A typical four-point mounting system has two hinges mounted at the front corners of the hood. The hinges allow rotation of the hood relative to the frame or chassis when opening and closing the hood. The rear of the hood is supported on pads located at the rear corners of the hood. The pads align the vertical position of the hood with the adjacent cab surfaces in a closed operating position. The pads also allow fore and aft translation of the hood relative to the cab to accommodate cab and frame deflection, particularly when the cab has a suspension system.

Another previously known way of mounting a hood to a frame and cab of a truck is to utilize an alternative four-point mounting system. According to this construction, the mounting system has a pair of front hinges and a pair of rear elastomeric guide pins that align the hood with the cab in a desired operating position. Such a rear hood support system induces forces into the hood as the cab and hood try to move relative to each other. This loading can result in excessive loading on the hood and failure in extreme cases. It also has a negative impact on the cab ride due to restriction of the cab suspension.

Prior art truck hood mounting systems also have not provided adequate ease of use with regard to opening and closing the hood. It is desirable to provide relatively low force requirements for both opening and closing the hood. It is also desirable to have some ability to maintain an open hood in the opened position.

Thus, there has remained a need for trucks having an improved hood and cab mounting system.

BRIEF DESCRIPTION OF THE DRAWINGS

Preferred embodiments of the invention are described below with reference to the accompanying drawings, which are briefly described below.

FIG. 5 is a sectional view taken along line 5—5 of FIG. 4 depicting the hinge assembly in an assembled configuration.

FIG. 6 is a cross-sectional view taken along line 6—6 of FIG. 5.

FIG. 7 is an enlarged exploded perspective view of the latch assembly of FIGS. 1–3.

FIG. 8 is a perspective view of the hood with a preferred spring actuator assembly shown in greater detail.

FIG. 9 is a side elevation view of the spring actuator assembly with the hood closed.

FIG. 10 is a side elevation view of the spring actuator assembly with the hood open.

FIGS. 11 and 12 are detail side elevational views of primary spring actuators.

FIG. 13 is a schematic view of the spring actuator and hood in a closed position.

FIG. 14 is a fragmented view of the spring actuator corresponding approximately with the hood position shown in FIG. 14.

FIG. 15 is a schematic view of the spring actuator and hood in a partially open position.

FIG. 16 is a fragmented view of the spring actuator corresponding approximately with the hood position shown in FIG. 15.

FIG. 17 is a schematic view of the spring actuator and hood in a fully open and locked position.

FIG. 18 is a fragmented view of the spring actuator corresponding approximately with the hood position shown in FIG. 17.

FIG. 19 is a schematic view of the spring actuator and hood in a fully open and unlocked position.

FIG. 20 is a fragmented view of the spring actuator corresponding approximately with the hood position shown in FIG. 19.

FIG. 21 is a schematic view of the spring actuator and hood in a closing movement.

FIG. 22 is a fragmented view of the spring actuator corresponding approximately with the hood position shown in FIG. 21.

SUMMARY EXPLANATION OF INVENTION FEATURES

Figure 1:
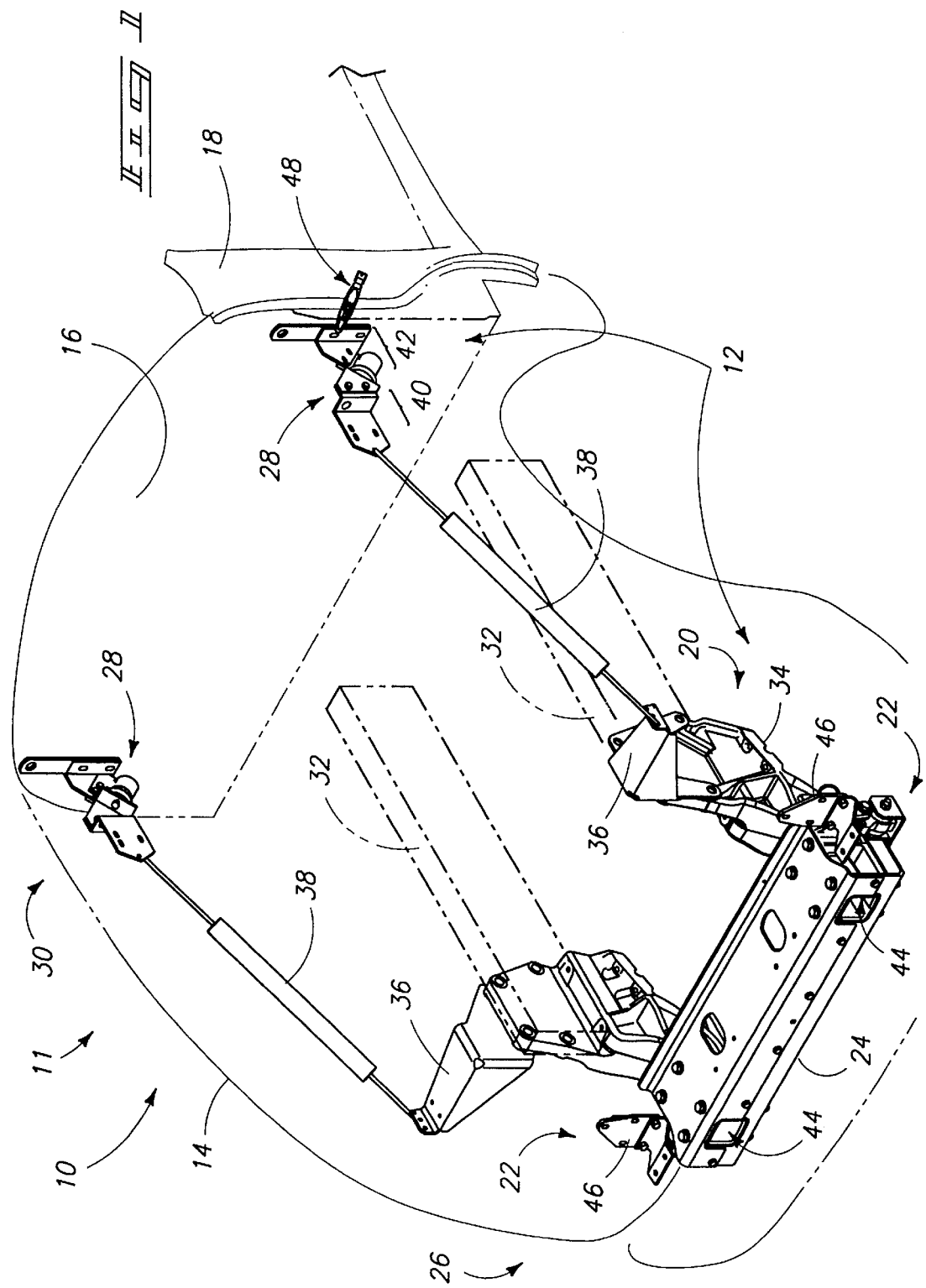
FIG. 1 is a perspective view of a hood assembly including a hood mounting system embodying this invention. The hood and portions of the frame and cab are shown in phantom.

To assist in understanding and defining the invention, the description in this section indicates the various features of the invention in differing forms and manners of description. The novelty of the invention comprises one or more of the features described either in this section, or according to the more detailed description given in the next section.

In one aspect, the invention includes a hood mounting system which can be more specifically described as a compliant hinge assembly mounted between a hood and a frame and a pair of detachable mating members mounted between a hood and a cab for positioning the hood relative to the cab, with the hinge assembly allowing the hood to move in compliant relationship relative to the frame. In another form, the invention includes a vehicle which can be more specifically described as a frame, a cab carried by the frame, a hood carried by the frame and the cab, at least one hinge assembly mounted between a hood and the frame capable of compliant relative movement therebetween, and at least one pair of detachable mating members mounted between the hood and the cab to position the hood relative to the cab when engaged therebetween. In yet another form, the invention includes a hood hinge assembly which can be more specifically described as a support member for mounting the hinge assembly to a vehicle frame, a rocker member pivotally connected to the support member along a first pivot axis, at least one resilient spacer member disposed between the rocker member and the support member so as to impart compliance therebetween, a bushing connected to the rocker member, and serving to define a second pivot axis, and a hood connection bracket pivotally connected to the bushing.

In another aspect, the invention includes a vehicle hood having one or more hinges to allow pivotal action of the hood and at least one spring actuator mounted between the frame and hood to exert force on the hood and assist movement of the hood between open and closed positions. The spring actuator or actuators preferably include a locking device which can advantageously be automatic in operation to assure locking when the hood is opened sufficiently.

Further, the invention includes a method for mounting a hood to a frame and a cab.

DETAILED DESCRIPTION OF THE PREFERRED EMBODIMENTS

This disclosure of the invention is submitted in furtherance of the objectives of patent laws to promote the progress of science, technology and the useful arts.

TABLE 1

Listing of Subsections of Detailed Description and
Pertinent Items with Reference Numerals and Page Numbers

| | | |
|---|---|---|
| Overview | 8 | |
| hood assembly 10 | 8 | |
| vehicle 11 | 8 | |
| hood mounting system 12 | 8 | |
| hood 14 | 8 | |
| cowl, or A-pillar cover 16 | 8 | |
| cab 18 | 8 | |
| chassis, or frame 20 | 8 | |
| hinge assemblies 22 | 8 | |
| front cross member 24 | 8 | |
| frontal portion 26 | 8 | |
| mating members, or latch/guide assemblies 28 | 9 | |
| rearward portion 30 | 9 | |
| Vehicle Frame | 10 | |
| frame rails 32 | 10 | |
| front drive brackets 34 | 10 | |
| tow pin receivers 44 | 10 | |
| Hood Spring Assemblies - Generally | 11 | |
| support arm 36 | 11 | |
| spring assembly 40 | 11 | |
| guide assembly 42 | 11 | |
| Spring Actuators | 12 | |
| spring actuators 200 | 12 | |
| auxiliary spring actuator 202 | 12 | |
| primary spring actuator 204 | 12 | |
| locking device 206 | 13 | |

TABLE 1-continued

Listing of Subsections of Detailed Description and
Pertinent Items with Reference Numerals and Page Numbers

| | |
|---|---|
| Spring Actuator Casings and Springs | 13 |
| actuator casing 208 | 13 |
| a first end 210 | 13 |
| second end 212 | 13 |
| actuator rod 214 | 13 |
| first mounting member 216 | 14 |
| second mounting member 218 | 14 |
| plunger or head 222 | 16 |
| Locking Device | 17 |
| lock member 224 | 19 |
| lock handle 226 | 19 |
| first actuator catch 228 | 19 |
| flat catch surface 229 | 19 |
| operator 230 | 19 |
| locking spring 232 | 20 |
| resetting device 234 | 21 |
| resetting dog 236 | 21 |
| Operation of the Spring Actuators and Locking Device | 22 |
| Compliant Hood Hinge Assemblies | 28 |
| hood connection bracket 46 | 28 |
| hinge assemblies 22 | 28 |
| latch retainers 48 | 29 |
| gap 50 | 29 |
| hood cross member 52 | 29 |
| forward mounting member 54 | 29 |
| pivot mounts 56 | 30 |
| shock absorber mounts 58 | 30 |
| isolator assembly 60 | 31 |
| inner support bracket 62 | 31 |
| outer support bracket 64 | 31 |
| rocker member 66 | 31 |
| rubber isolator 68 | 31 |
| rubber isolator 70 | 31 |
| bolt 72 | 31 |
| nut 74 | 31 |
| washer 75 | 31 |
| bolts 76 | 31 |
| nuts 78 | 31 |
| washers 80 | 31 |
| slotted aperture 82 | 31 |
| heels 84 | 31 |
| bushing 86 | 32 |
| split sleeve 88 | 32 |
| retainer 90 | 32 |
| recess 92 | 32 |
| T-shaped slot 94 | 32 |
| bolt 96 | 32 |
| nut 98 | 32 |
| washer 100 | 32 |
| bolt 102 | 33 |
| washer 104 | 33 |
| washers 106 | 33 |
| nut 107 | 33 |
| arm 108 | 33 |
| mounting plate 110 | 33 |
| slotted apertures 112 | 33 |
| slotted aperture 114 | 33 |
| depending bracket 116 | 34 |
| slotted apertures 118 | 34 |
| weld nuts 120 | 34 |
| retaining bolts 119 | 34 |
| washers 121 | 34 |
| reduced-diameter portion 122 | 35 |
| bore 124 | 35 |
| trenches 126 | 35 |
| sleeve 128 | 35 |
| Detachable Coupling For Hood-Cab Interface | 37 |
| pin 130 | 38 |
| hood bracket 132 | 38 |
| angle bracket 134 | 38 |
| guide member 136 | 38 |
| cowl bracket 138 | 38 |
| slotted apertures 140 | 39 |
| bolts 142 | 39 |

TABLE 1-continued

Listing of Subsections of Detailed Description and
Pertinent Items with Reference Numerals and Page Numbers

| | | |
|---|---|---|
| washers | 144 | 39 |
| nuts | 146 | 39 |
| apertures | 148 | 39 |
| nut | 150 | 39 |
| threaded stem | 152 | 39 |
| enlarged shoulder | 154 | 39 |
| bolts | 156 | 39 |
| guide bracket | 158 | 39 |
| Methods | | 40 |

Overview

Referring in more detail to the drawings, FIG. 1 is a perspective view illustrating a hood assembly 10 on a vehicle 11 including a hood mounting system 12 of this invention. The system is for supporting a hood 14 between a cowl, or A-pillar cover 16 of a vehicle cab 18 and a vehicle chassis, or frame 20. The hood mounting system 12 has a pair of novel hinge assemblies 22 mounted to a front cross member 24 of the vehicle chassis 20. The hinge assemblies 22 serve to pivotally mount a frontal portion 26 of hood 14 to the chassis 20. The system also preferably includes two pair of mating members, or latch/guide assemblies 28. These assemblies are provided in laterally-spaced-apart relation with mating parts which provide mechanical engagement between the cowl 16 of cab 18 and a rearward portion 30 of hood 14 when the hood is closed.

According to the hood mounting system 12 of this invention, a substantial amount of mechanical compliance is provided between hood 14 and frame 20. The most preferred form also provides a limited amount of compliance between the hood 14 and cab 18, even though they are secured together. The compliance provided by this system is desirable to accommodate roll, bucking and deflection of the cab and frame that can otherwise cause loading of the hood. A substantial amount of fore and aft compliance is provided, while additional compliance accommodates hood to frame yaw and roll. According to one construction as shown in FIG. 1, a fore-and-aft spring rate for the hood relative to the frame is approximately 250 lbs./inch, an up/down spring rate is 5800 lbs./inch, and a lateral spring rate is 2500 lbs./inch. Such a construction provides a rigid body natural frequency above 10–20 Hertz, and preferably in the range of 20–25 Hertz. Preferably, system 12 accommodates at least 2 degrees of yaw, 7 degrees of roll, and 15 mm of forward compliance, with little or no lateral compliance.

Vehicle Frame

Chassis 20 of FIG. 1 comprises a vehicle frame having a pair of longitudinally extending C-section shaped frame rails 32 and a corresponding pair of front drive brackets 34. One bracket 34 is mounted to the front end of each rail 32 with threaded fasteners, and cross member 24 is mounted between the pair of brackets 34 with threaded fasteners. In this manner, a rigid front structural member is formed by cross member 24. Member 24 is supported in a lowered configuration relative to rails 32, from brackets 34 so that it will align with the bumpers of smaller passenger vehicles.

Front cross member 24 is formed from top- and bottom-stamped steel sections that are secured together with a plurality of threaded fasteners. The fasteners extend through vertically extending apertures on each front drive bracket 34, as well as each section, on the top and bottom surfaces of each bracket 34. Additionally, threaded fasteners are used to secured the sections together along a front vertical face of member 24.

A pair of tow pin receivers 44 are formed from each front drive bracket 34 to enable vehicle towing while maintaining a clean and aerodynamic bumper profile. A tow pin (not shown) is removably received in each receiver 44 when it becomes necessary to tow the vehicle 11. Typically, a removable retaining pin (not shown) retains the pin in the receiver. Apertures are also formed in the front vertical face of cross member 24, enabling access to receivers 44. Similarly, apertures (not shown) are provided in a bumper facia portion of hood 14.

Hood Spring Assemblies—Generally

A support arm 36 is mounted to the top of each bracket 34 with the same threaded fasteners, or bolts that are used to mount bracket 34 to each rail 32. To reduce weight while providing a rigid support, arm 36 is formed from a stamped section of sheet metal. Arm 36 is configured to support one end of a spring assembly 38. The other end mounts to the rearward portion 30 of hood 14, producing force that counteracts the weight of the hood when it is being opened and closed. A latch assembly 40 is mounted to the other end of each spring assembly 38 to facilitate attachment of hood 14 to cab 18. Latch assembly 40 removably mates with a complementary guide assembly 42 that is mounted to cowl 16 on either side. Latch assembly 40 and guide assembly 42 together form a pair of the mating members 28.

Spring assembly 38 is formed from a pair of end rods that are coupled together with a mechanical coil spring that is under compression, in the position shown in FIG. 1. The spring is contained within a tubular housing, or can. Alternatively, a gas or pneumatic spring can be used in place of a coil spring. Preferably, spring assembly 38 causes the effective force necessary to lift hood 14 to be about 30 lbs. force. A similar force is needed to close hood 14.

Spring Actuators

FIGS. 8 and 9 show that the spring assembly 38 of FIG. 1 includes at least one and preferably a pair of spring actuators 200 that are mounted between the hood and frame to assist movement of the hood between open and closed positions. The preferred spring actuator assembly 200 thus includes an auxiliary spring actuator 202 mounted between the hood and vehicle frame substantially parallel to, and in lateral opposition to, a primary spring actuator 204. The actuators 202, 204 are advantageously parallel and are situated in lateral opposition on opposed sides of the hood 14. Together, the actuators produce a force acting between the hood and the vehicle frame to assist manual movement of the hood between the open and closed positions. To accomplish this, the actuators 202, 204 are positioned with respect to the axis of the hood, with forward ends mounted to the frame at the frontal portion 26 of the hood above the hood axis, and rearward ends at the rearward hood portion 30.

Each actuator includes an internal spring that may be formed of an appropriate resilient and compressible material or device, such as air, urethane foam elastomer, or another appropriate resilient device. Most preferably, the springs are coil compression springs, such as helical coil springs made of steel or other suitable materials. Exemplary materials include high strength spring steels. The springs are arranged and connected to other parts of the actuators so as to normally bias the actuators to retract in length. The geometry of the actuator mounting points in relation to the hood pivot axis is such that forces are exerted to aid the user in both opening and closing the hood.

Additional structure in the form of a locking device 206 is advantageously provided to lock the primary actuator 204 in its extended position at the open position of the hood.

Other than the locking device 206 being provided on the primary actuator 204, the two actuators 202, 204 may be substantially identical. Like components of the two actuators will thus be described using similar reference numerals.

Spring Actuator Casings and Springs

As indicated above, both spring actuators 202, 204 are similar with the exception of the locking device 206 which is preferably situated on the primary actuator 204. This allows a single person to unlock the hood from an open position from one side of the vehicle. The following description of one actuator device 204 will suffice for both actuators 202 and 204 except with regard to the locking device portion. Alternatively, both actuators can be of the same construction.

Each preferred spring actuator includes an elongated actuator casing 208 having a first end 210, a second end 212 and an actuator rod 214 slidably received within the actuator casing 208. The actuator rod 214 projects from the second end 212 of the actuator casing. The casing 208 may be formed of tubular material, preferably a rigid metal such as steel, with an elongated internal bore. It is preferred that the first end 210 be closed, and that the second end 212 be only partially open to allow longitudinal sliding movement of the actuator rod 214 with respect to the casing. The second end 212 is more preferably provided with an end piece 213 (See FIGS. 11 and 12). The end piece is an annular member with a central opening which acts as a bearing about rod 214 which is slidable with respect thereto. The end piece 213 is advantageously made of nylon or other suitable materials. End pieces 213 are captured between spring 220 and an end wall of casing 208 which is welded or otherwise attached thereto.

A first mounting member 216 is provided at the first end 210 of the casing. The first mounting member 216 pivotably secures the actuator 200 to the vehicle frame above the hood axis adjacent the frontal portions 26 of the hood 14. The preferred mounting member 216 includes a ball or other appropriate joint to permit relative motion of the actuators relative to the vehicle frame 20 at the first ends 210. In FIG. 14, the mounting member 216 is shown rotated 90° for better illustration.

A second mounting member 218 is provided at the outward end of the actuator rod 214. The second mounting member 218 pivotably secures the actuator 202, 204 to the hood 14 at the rearward portions 30 thereof, above and rearwardly of the first mounting member 216. The preferred mounting members 218 are similar to the mounting members 216, including ball joints that will permit relative pivotal motion between the actuators and the hood.

It is to be understood that either or both actuators 202, 204 could be reversed from the orientation shown (FIGS. 8–10). That is, the second mounting member 218 could be attached to the frame 20 and the first mounting member 216 could be attached to the hood 14. In either circumstance, one of the mounting members 216, 218 is configured for attachment to the vehicle frame 20 and the other one of the mounting members is configured for attachment to the vehicle hood 14.

It is preferred that the first mounting members 216 enable pivotal motion of the spring actuators about pivot points or axes that are fixed relative to the vehicle frame 20. The second mounting members 218 travel with the actuators 202, 204 in an arcuate path centered on the hood pivot axis. Because the mounting locations for both members 216 and 218 are spaced above the hood pivot axis and are not aligned therewith, the actuators 202, 204 will pivot, translate and change in length as the hood moves between open and closed positions.

A spring 220 within each actuator casing, engages the actuator casing 208 and actuator rod 214 to bias the actuator rod. This is preferably done so as to bias in one direction which tends to contract the length of the actuator. The actuator rod 214 will also slide within the actuator casing toward an extended or expanded position. This is preferably against yieldable resistance applied by spring 220 or other suitable spring member. The force applied by spring 220 assists the user in lifting the hood 14 to the open condition, and will also assist in closing the hood. The spring rates for the primary and secondary spring actuators can be the same, approximately the same, or if desired the rates can be different. Typical spring rates fall in the range of 1–10 pounds force per inch of spring displacement, more preferably 3–7 pounds per inch, even more preferably 4–6 pounds per inch. The springs can advantageously be pre-loaded by compressing the springs prior to containment in the casings. Typical pre-loading values result in initial forces of about 20 to about 100 pounds force, more preferably 50–80 pounds force.

It is noteworthy that the actuators are substantially rigid against lateral deflection and bending. This is an advantage in that the actuators will not bounce or sway from side-to-side during movement of the associated vehicle over rough terrain. The actuators may therefore be placed in relatively confined spaces without concern that they will damage adjacent components or rattle as the vehicle moves along. This should be compared to open springs which both laterally deflect and can strike adjacent parts of the vehicle.

The preferred spring 220 is a single helical coil compression spring within the actuator casing 208. One end of the spring 220 abuts the partially-closed second end 212 inside the casing 208. The other end of the spring engages a plunger or head 222 of the actuator rod 214. The actuator casing 208 thus confines the spring about its external diameter and provides longitudinal guidance to the plunger or head 222. The spring also biases rod 214 into a retracted position. The actuator rod 214 passes longitudinally through the coils of the spring, minimizing the necessary length dimension of the spring assembly.

FIG. 14 further shows an optional and preferred spring control member 215. Spring control member 215 is advantageously in the form of a cylindrical tubular member positioned between coil spring 220 and rod 214. The spring control member serves to better align the spring and reduce lateral movement as the spring is compressed or expanded with travel of rod 214. Spring control tube 215 can be made from a variety of suitable materials, such as polyvinyl chloride tubing.

The actuators are mounted, using the mounting members 216 and 218, in such a manner that the springs 220 will bias the actuator rods 214, producing a force against the hood in the closed position to offset a part of the hood weight applied about the hood pivot axis. Likewise when the hood is fully open, the springs 220 will exert a counteracting force tending to offset that part of the hood weight applied about the hood axis that would otherwise tend to open the hood further. It can thus be seen that the actuators will assist a worker by reducing the strength required to both open and close the hood 14.

Locking Device

The locking device 206 is operably connected to the associated actuator casing 208 to limit movement of the actuator rod relative to the actuator casing. This is preferably done at one of the extended or retracted positions, most preferably at the extended position. In a form shown, the locking device 206 is operably connected to the spring actuator. It is also preferred that the locking device be operable in response to movement of the hood to lock the hood in an open position. In this position, the actuator 204 is extended, the spring 220 is fully compressed, and the locking device 206 is used to lock the actuator 204 in this extended position, thereby locking the hood 14. This serves to protect a mechanic or driver against possible injury in case the hood is forced by wind or other factors. The lock is released to allow hood closure. This is preferably done by manual operation of the lock. Alternatively, the locking device may be manually operated to lock the hood in the open position instead of automatically locking upon opening. The locking device 206 is movable to a release position to permit the hood to move from the open position to a closed or partially closed position.

It is preferred that only one locking device 206 be provided on one of the actuators, preferably the primary spring actuator 204. Details of the preferred locking device are shown in an operational sequence by FIGS. 13–22.

The locking device 206 is advantageously situated on the underside of the actuator 204 when the hood is closed (FIG. 13) but will pivot to an upwardly, more accessible position (FIG. 21) when the hood is open. The location of the locking device 206 in the open position of the hood is an advantage in that the user will have ready access to the locking device when it is desired to close the hood.

The first preferred locking device 206 is mounted to the actuator casing 208 and interacts with the actuator rod 214. In a locking position, the device 206 locks the actuator 204 in its extended position. In the preferred illustrated example, the locking device is mounted to lock the associated spring actuator 204 in its extended position in which the actuator rod is fully, or nearly fully, extended from the actuator casing 208.

In one form, the locking device 206 includes a lock member 224 pivotably mounted to the actuator casing 208 at a pivot shaft 243 which is supported on a pivot bracket 245. The lock member 224 includes a lock handle 226 and is pivotably mounted to the actuator casing. The lock handle 226 facilitates manual pivotal operation of the locking device. However, at least some of the actions of the preferred lock member 224 will occur automatically as explained below.

A first actuator catch 228 on the lock member 224 is pivotable with the lock handle 226 between a locking position (FIGS. 17, 18) for locking engagement with the actuator rod, and an unlocked position (FIGS. 19, 20). In the locked or locking position, the catch 228 is received through a slot formed in the actuator casing 208, and is situated in the path of movement of the moving assembly which includes actuator rod 214 or plunger 222. The catch 228 includes a flat catch surface 229 on one side facing the second end 212 of the casing 208, for locking abutment with the plunger 222. An operator 230 is also provided on the catch 228 in opposition to the catch surface 229. The operator 230 is inclined and facing substantially toward the first end 210 of the casing 208 for sliding engagement with the plunger 222.

In the unlocked position, the catch 228 has been pivoted to a lateral position clear of the actuator rod 214 and plunger 222 to permit longitudinal motion of the actuator rod 214 with respect to the actuator casing 208. The catch may be pivoted to the unlocked position manually by lifting the lock handle 226.

Automatic movement of the lock member 224 is enabled by force applied to the operator 230 which causes pivotal movement of lock member 224. Operator 230 is positioned to engage the actuator rod 214 and shift the actuator catch 228 clear of the actuator rod 214 responsive to movement of the actuator rod 214 to the extended position. The operator 230 is inclined as indicated to accomplish this function which is shown in sequence by FIGS. 16 and 18.

A locking spring 232 is provided between the lock member 224 and its mounting bracket to normally urge the lock member 224 toward the locking position (FIGS. 17, 18). More preferably, there are a pair of locking springs 232 on opposing sides of member 224. The spring 232 is also mounted in such a manner that the lock member 224 may be manually pivoted to an over-center release position (FIGS. 21, 22). The spring 232 will hold the lock member in this position until manually or automatically acted upon to return to the locking or reset position.

The spring 232 also serves to yieldably hold the locking member 224 in the locking position (FIGS. 14 and 18). However the spring 232 will allow the locking member 224 to pivot up to allow the plunger 222 to slide to the extended position (FIGS. 17, 18) in response to movement of the plunger 222 against the operator 230. After the plunger has moved past the operator 230 on the way to the extended position, the spring 232 will pull the locking member 224 back down, bringing the flat catch surface 229 of the actuator catch 228 back down into the casing 208 and locking the actuator 204 in the extended position. This occurs as the hood 14 is opened to provide automatic locking when the hood is fully or nearly fully opened.

The preferred locking device further comprises a resetting device 234 operable in response to movement of the hood toward the closed position to automatically shift the locking device to a reset position for automatic operation to lock the hood in the open position responsive to a successive movement of the hood to the open position.

The resetting device 234 is preferably comprised of a resetting dog 236 which, like the catch 228, may be an integral part of the lock member 224. The resetting dog 236 extends from the lock member 224 in angular relation to the catch 228 so that angular motion of the lock member 224 to the position shown in FIGS. 19 and 20 will bring the dog 236 into position within the casing 208. The dog 236 is thus positioned for engagement with the plunger head 222 as the hood 14 is closed and the actuator rod is partially extended (FIGS. 21 and 22). The extending actuator rod via plunger 222 pushes the dog 236, causing the lock member to pivot. The spring 232 then shifts back over center and pulls the lock member 224 back to the position similar to that shown in FIG. 14, resetting the locking device 206 to automatically operate during the next successive movement of the actuator to the extended position as the hood 14 is moved again to the open position.

Operation of the Spring Actuators and Locking Device

Prior to operation, it is preferred that two spring actuators 202, 204 be mounted between the hood 14 and the vehicle frame. The actuators are preferably installed on opposed sides of the hood 14 (FIG. 8). The mounting members 216 are installed on the vehicle frame above the hood axis, and the second mounting members 218 are installed on forward portions 26 of the hood 14 above the first mounting members 216. The primary spring actuator 204, preferably installed on the right-hand side of the hood 14 (looking from the driver's seat) has the locking device 206.

Both spring actuators 202, 204 are installed with the internal springs 220 slightly compressed. This produces a force between the frame and hood that counteracts some of the hood weight and consequently reduces the force required to open the hood.

As the worker manually raises the hood 14 from the closed position, the spring actuators pivot. Pivotal action occurs upwardly about the axes of the first mounting members 216. The plungers 222 inside the actuator casings compress the springs 220 as the actuator rods 214 are pulled outwardly toward the extended positions (FIGS. 15, 16). As the rods are pulled out of the actuator casings 208, the increasing spring force causes the force applied by the actuators to increase.

As the hood opens, the center of gravity of the hood moves from behind the hood axis to forward of the hood axis. When the center of gravity of the hood is directly above the hood axis the hood will approximately balance. During this motion, the spring actuators 202, 204 first shorten, then lengthen as the hood center of gravity moves from behind to forward of the hood axis. As the hood 14 pivots open further, the spring actuators 202, 204 extend further and the force increases. This reduces the physical effort required by the worker to open the hood, since the springs 220 are compressed further.

As the springs 220 become nearly fully compressed, the plunger passes by the lock member 224, engaging the operator 230 of the catch member 228 (FIGS. 15, 16). The plunger 222 moving against the operator 230 cams the lock member 224 upwardly against resistance of the spring 232. The spring will snap the lock member 224 back down as the plunger 222 passes, again bringing the catch surface 229 down into alignment with the plunger, locking the primary spring actuator 204 in the extended position as the hood becomes fully open. The distal surface of the handle 226 now facing the casing will not allow the lock member to pivot in response to force applied to surface 229 by plunger 222. A positive action by the user is required to unlock the hood, in the construction shown handle 226 is lifted. The locking feature is an advantage in that the hood cannot close accidently on a worker, even if external forces such as a sudden gust of wind moves against the hood while it remains open.

The springs 220 are fully or nearly fully compressed at the full open position of the hood 114. If fully compressed, the spring actuators 202, 204 become mechanically solid which effectively stops the actuator rods from extending further. In such position, the center of gravity is now on the opposite (front) side of the hood pivot axis, and the spring actuators are again operating (pulling against the hood) to reduce the force required to close the hood.

To close the hood, the worker lifts the locking handle 226 to the position shown in FIGS. 19 and 20 to unlock the actuator 204 and allow the hood 14 to close. The lock spring 232 will shift to the over-center position shown in FIG. 20, holding the locking handle 226 in the open position. This also moves the resetting device 234 into position, with the dog 236 extending into the casing 208 for engagement by the plunger 222 as the actuator retracts during the initial closing movement of the hood 14. The hood is pushed toward the closed position, with the springs 220 assisting.

As the hood 14 moves about the hood axis toward the closed position, the actuator rod 314 and plunger 222 retract and move against the dog 236. Continued movement of the plunger 222 against the dog 236 causes the lock member 224 to pivot, bringing the lock spring 232 back over center (FIGS. 21, 22). The over-center spring 232 will now snap the lock member back to the initial locking position (FIG. 14). However by this time, the plunger 222 will have moved on past the operator 230, before the operator 230 swings back into the casing 208. The lock member 224 is thus reset for the next hood opening operation. This again is a safety advantage since the resetting operation of the locking member 224 is automatic and does not require special effort by the worker. Still further, if the lock member 224 is inadvertently shifted to the unlock position (FIG. 19) before the hood is opened, the dog 236 will not permit the hood to be fully opened. The lock member must be shifted back to the locking position before the hood can be fully opened.

Prior to operation, it is preferred that two spring actuators 202, 204 be mounted between the hood 14 and the vehicle frame. The actuators are preferably installed on opposed sides of the hood 14 (FIG. 8). The mounting members 216 are installed on the vehicle frame above the hood axis, and the second mounting members 218 are installed on forward portions 26 of the hood 14 above the first mounting members 216. The primary spring actuator 204, preferably installed on the right-hand side of the hood 14 (looking from the driver's seat) has the locking device 206.

Both spring actuators 202, 204 are installed with the internal springs 220 slightly compressed. This produces a force between the frame and hood that counteracts some of the hood weight and consequently reduces the force required to open the hood.

As the worker manually raises the hood 14 from the closed position, the spring actuators pivot upwardly about the axes of the first mounting members 216. The plungers 222 inside the actuator casings compress the springs 220 as the actuator rods 214 are pulled outwardly toward the extended positions (FIGS. 15, 16). As the rods are pulled out of the actuator casings 208, the main spring compression causes the force to pull the actuator rods 214 to increase.

As the hood opens, the center of gravity of the hood moves from behind the hood axis to forward of the hood axis (when the center of gravity of the hood is directly above the hood axis the hood will balance). During this motion, the spring actuators 202, 204 shorten, then lengthen as the hood center of gravity moves from behind to forward of the hood axis. As the hood 14 pivots open further, the spring actuators 202, 204 extend further and the force output increases. This reduces the physical effort required by the worker to open the hood, since the springs 220 are compressed further.

As the springs 220 become nearly fully compressed, the plunger passes by the lock member 224, engaging the operator 230 of the catch member 228 (FIGS. 15, 16). The plunger 222 moving against the operator 230 cams the lock member 224 upwardly against resistance of the spring 232. The spring will snap the lock member 224 back down as the plunger 222 passes, again bringing the catch surface 229 down into alignment with the plunger, locking the primary spring actuator 204 in the extended position as the hood becomes fully open. The flat surface of the catch member 226 now facing the plunger 222 will not allow the plunger to move back toward the extended position and the hood is effectively locked open. A positive action by the user is required to unlock the hood. This is an advantage in that the hood cannot close accidently on a worker, even if external forces such as a sudden gust of wind moves against the hood while it remains open.

The springs 220 are fully compressed at the full open position of the hood 114, and the spring actuators 202, 204 become solid which stops the actuator rods from extending further. Further the center of gravity is now on the opposite side of the hood axis, and the spring actuators are again operating (pulling against the hood) to reduce the force required to close the hood.

To close the hood (and retract the actuators), the worker lifts the locking handle 226 to the position shown in FIGS. 19 and 20 to unlock the actuator 204 and allow the hood 14 to close. The lock spring 232 will shift to the over-center position shown in FIG. 20, holding the locking handle 226 in the open position. This also moves the resetting device 234 into position, with the dog 236 extending into the casing 208 for engagement by the plunger 222 as the actuator retracts during the closing movement of the hood 14. The hood is pushed toward the closed position, with the springs 220 assisting.

As the hood 14 moves about the hood axis toward the closed position, the actuator rod 314 and plunger 222 retract and move against the dog 236. Continued movement of the plunger 222 against the dog 236 causes the lock member 224 to pivot, bringing the lock spring 232 back over center (FIGS. 21, 22). The over-center spring 232 will now snap the lock member back to the initial locking position (FIG. 14). However by this time, the plunger 222 will have moved on past the operator 230, before the operator 230 swings back into the casing 208. The lock member 224 is thus reset for the next hood opening operation. This again is a safety advantage since the resetting operation of the locking member 224 is automatic and does not require special effort by the worker. Still further, if the lock member 224 is inadvertently shifted to the unlock position (FIG. 19) before the hood is opened, the dog 236 will not permit the hood to be fully opened. The lock member must be shifted back to the locking position before the hood can be fully opened.

Compliant Hood Hinge Assemblies

A hood connection bracket 46 is connected to the hood. The brackets 46 form part of hinge assemblies 22 which are connected at each end of cross member 24 to pivotally support frontal portions 26 of hood 14. Bracket 46 forms the upper part of hinge assembly 22. A lower part of assembly 22 forms a compliant and pivotable mount to which bracket 46 is connected. The compliance at the front hood mounts allow hood 14 to be securely mounted to cab 18. This is advantageously done using the pair of mating members 28 and a pair of accompanying hood latch retainers 48. As shown, each latch retainer 48 is formed from a rubber hold down strap that is mounted to cab 18 and a mating hook configured to removably engage with the strap that is mounted to hood 14.

Figure 2:
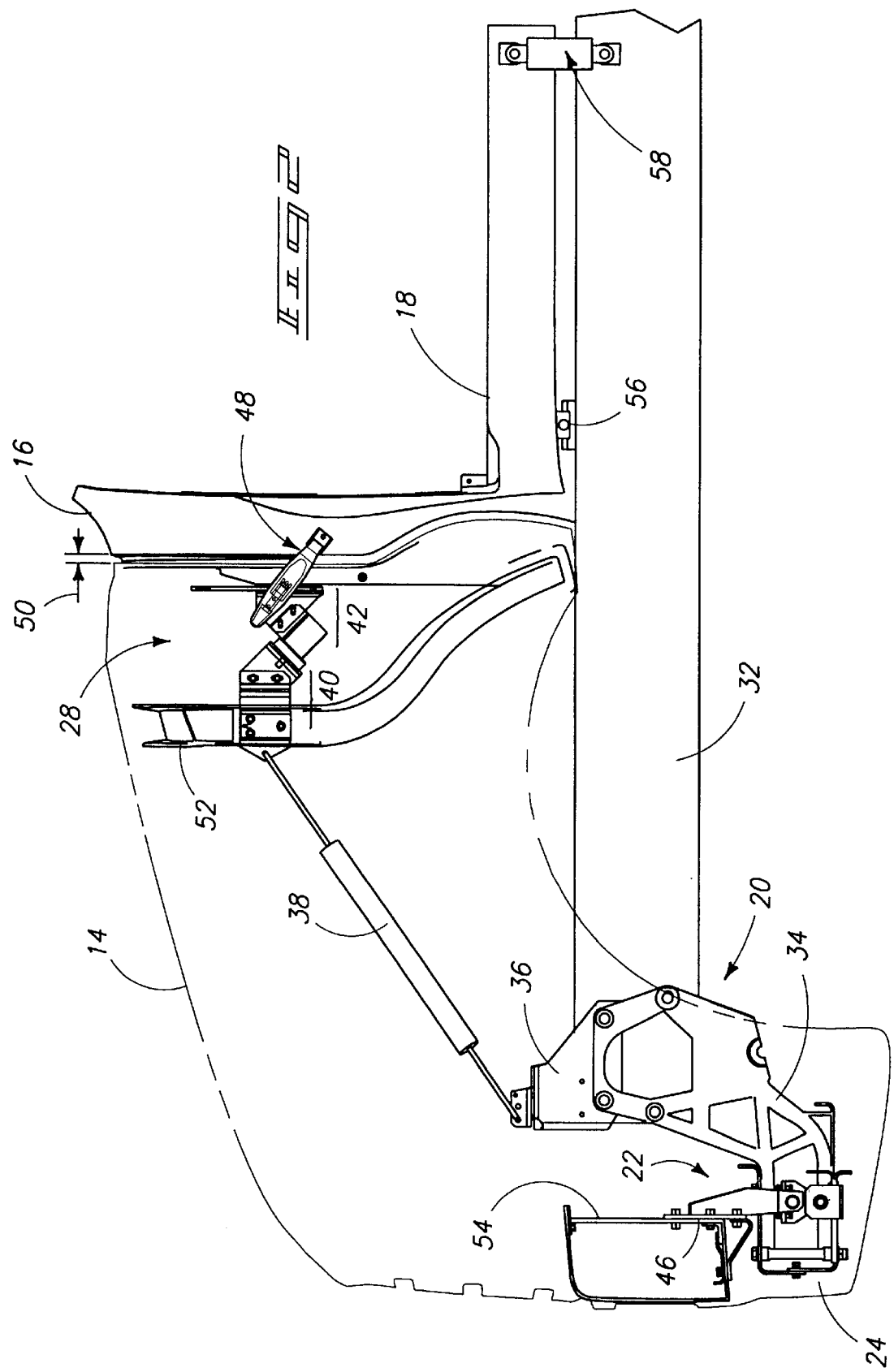
FIG. 2 is a side elevational view of the hood assembly of FIG. 1. The hood is shown in phantom in a lowered, closed position.

As shown in FIG. 2, a gap 50 is formed between hood 14 and cowl 16 of cab 18 when hood 14 is securely fastened in a lowered position with retainers 48. An attempt is made to minimize the size of gap 50 for aesthetics and aerodynamics. With the provision of compliant hinge assemblies 22, the hood to cab gap 50 can be minimized to allow the cab to snub the hood forward prior to contact between the cab and the hood. Mating members 28 and compliant hinge assemblies 22 will allow hood 14 to move forward without excessive loading of the hood in compression when the cab snubs the hood forward. Cab 18 can buck forward about 22 mm, and the hood to cab gap 50 can be set at about 16 mm maximum and 13 mm minimum. In this manner, hood 14 will snub forward to a 6 mm gap. Compliant hinge assemblies 22 will allow for about 12 mm to 14 mm forward movement of hood 14. In this manner, compliance in the hood mounting system means that the system will not restrain cab 18 nor interfere with its desired suspension characteristics.

As shown in FIG. 2, hood 14 has a hood cross member 52 and a forward mounting member 54 affixed along the inner surface to enforce the hood. Typically, hood 14, cross member 52, and a pair of laterally spaced apart mounting members 54 are formed from composite plastic material, such as sheet molding compound (SMC). Alternatively, fiberglass, various other composite materials, and even sheet metal can be used to form hood 14.

According to FIG. 2, a significant problem is presented by the fact that cab 18 is mounted to frame rails 32 via a suspension, causing movement of cowl 16 fore and aft. Namely, cab 18 is mounted to rails 32 via a forward positioned pair of pivot mounts 56 and a rearward positioned pair of shock absorber mounts 58. Typically, mounts 58 include a spring and a damper element for isolating shock from being transmitted to cab 18 from frame 20. This problem results in the above-mentioned snubbing of hood 14 overcome by the device of this invention.

Figure 3:
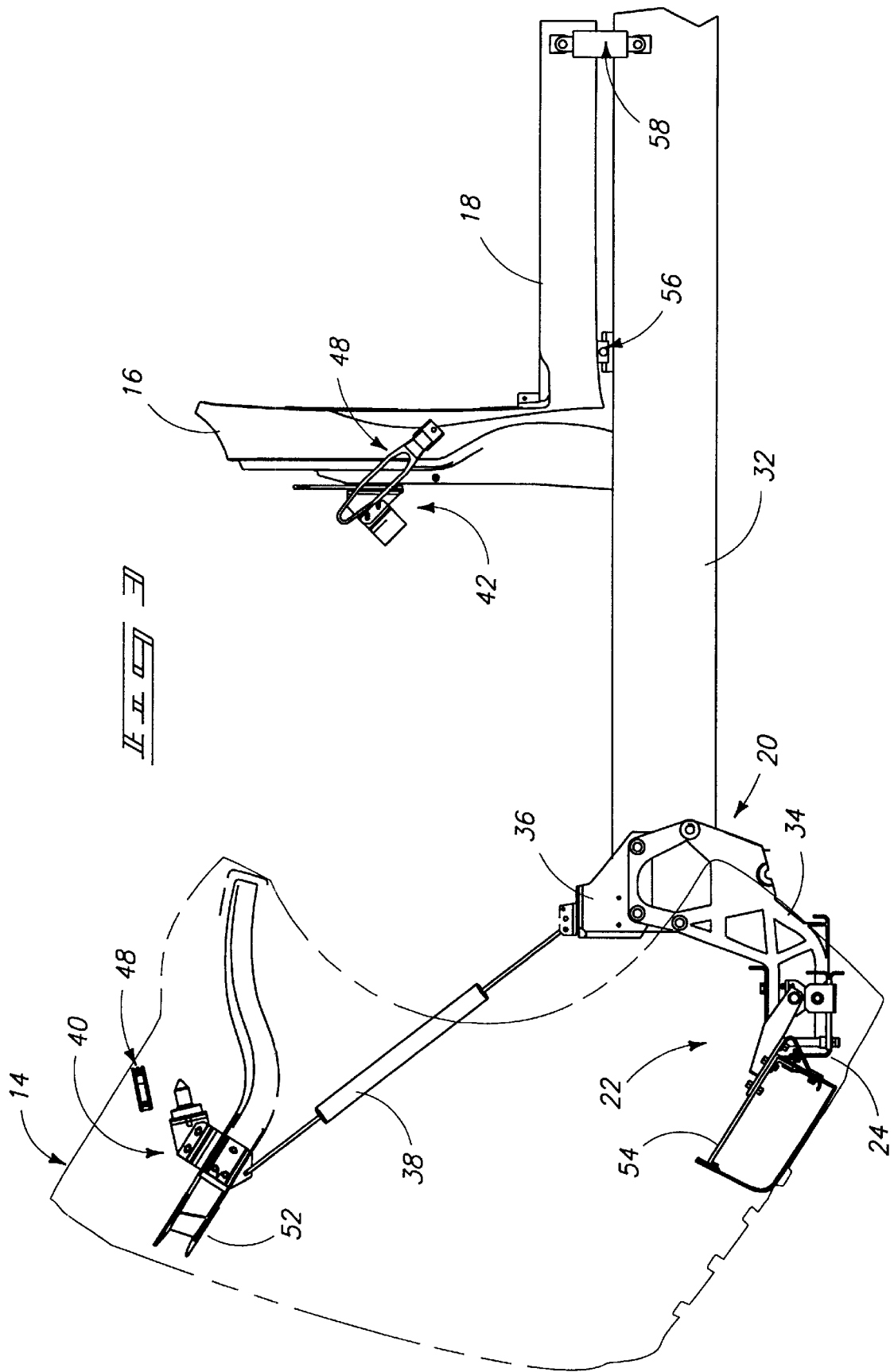
FIG. 3 is a side elevational view corresponding to that of FIG. 2, but with the hood illustrated in a raised, open position.

As shown in FIG. 3, hood 14 is raised to an open position with the assistance of the pair of mechanical spring assemblies 38. Hinge assembly 22 is shown pivoted to a forward position, with forward mounting member 54 and hood 14 caused to be positioned in corresponding rotated positions. Latch retainer 48 is shown in an unfastened, or decoupled configuration, with the rubber holddown strap being affixed to cab 18 and the mating hook being affixed to hood 14, on each side. Furthermore, latch assembly 40 and guide assembly 42 can be seen in their separated, or decoupled configurations.

Figure 4:
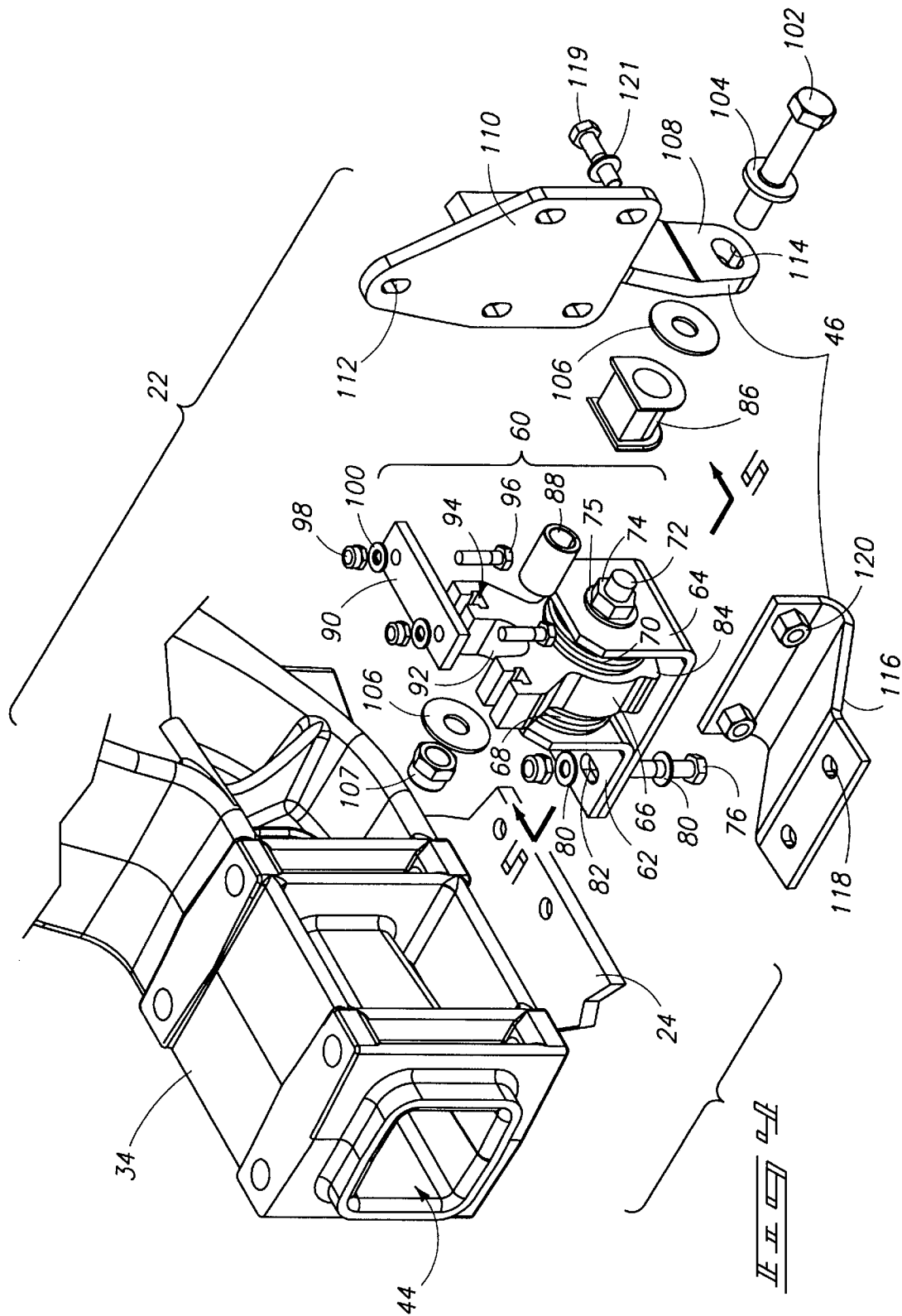
FIG. 4 is an enlarged exploded perspective view of a hinge assembly used on the hood mounting system of FIGS. 1–3.

FIG. 4 depicts hinge assembly 22 in exploded perspective view. Hinge assembly 22 is formed from an isolator assembly 60 having an inner support bracket 62 and an outer support bracket 64 fastened together and mounted to crossmember 24. Inner bracket 62 and outer bracket 64 pivotally support a rocker member 66 relative to brackets 62 and 64. Rocker member 66 is compliantly mounted to brackets 62 and 64 via a first rubber isolator 68 and a second rubber isolator 70. Rocker member 66 and isolators 68 and 70 are mounted between brackets 62 and 64 with a bolt 72, a nut 74, and a washer 75. In this manner, rocker motion of member 66 and compliance of isolators 68 and 70 allow fore and aft movement of an upper portion of member 66, as well as off-axis twisting that produces yaw and roll, providing a compliant isolator mount between the hood and frame. Isolators 68 and 70 are preferably constructed from rubber, with a durometer value in the range of 80–90.

Isolator assembly 60 is removably fastened to front crossmember 24 of the vehicle frame with a pair of bolts 76, nuts 78, and washers 80. Each bolt 76 is received through a slotted aperture 82 formed in each of brackets 62 and 64 to enable fore-and-aft positioning of assembly 60 along front drive bracket 34. In this manner, a hood mounted to brackets 46 can be aligned in assembly to the vehicle, enabling accurate fixturing therebetween.

Rocker member 66 of FIG. 4 has a pair of heels 84 formed along a bottom portion. Each heel 84 is disposed laterally of a central axis (not shown) of a bore in rocker member 66 that receives bolt 72. The pair of heels are constructed and arranged to engage with the support member formed by brackets 62 and 64 when rocker member 66 is pivoted between fore and aft positions. Heels 84 limit the amount of pivotal rocker motion of rocker member 66 in relation to support bracket 64. Bolt 72 is received through the bore (not shown) in a central portion of member 66. An upper portion of rocker member 66 supports a bushing 86 and a split sleeve 88 that are secured to member 66 with a retainer 90 within a recess 92. Recess 92 is formed within a clevis-shaped upper portion of member 66, and is configured to receive the hood connection bracket 46 along a first pivot axis, inside bushing 86, forming a second pivot axis therealong.

A T-shaped slot 94 is formed in member 66 on each side of recess 92 to facilitate retention of bushing 86, sleeve 88, and hood connection bracket 46 within recess 92. A head portion of a bolt 96 is retained within each slot 94, with retainer 90 being received over the opposite end of bolt 96 where it is secured with a nut 98 and a washer 100. In this manner, enlarged end portions on bushing 86 ensure that it is entrapped, or retained between retainer 90 and member 66.

Bushing 86 is formed from a tough yet slightly elastomeric material such as polyurethane in order to provide a low-friction mount for pivotally supporting the hood via hood connection bracket 46. Bushing 86 forms a pivot mount that connects with rocker member 66 for supporting a second pivot point. Bushing 86 has a higher durometer value than isolators 68 and 70, and serves principally to provide a low-friction surface having only nominal compliance. Compression sleeve 88 is formed from a rolled piece of steel, having a longitudinal split where the rolled sleeve comes together. Such a construction reduces the cost, eliminating the need to form sleeve 88 from a cylindrical piece of metal. Alternatively, sleeve 88 can be formed from a cylindrical piece of metal.

In assembly, sleeve 88 is compressively engaged by a bolt 102 and a washer 104, between a pair of washers 106. Bolt 102 securely retains bracket 46 between washer 104 and outer washer 106 when a nut 107 is secured to the opposite end. Sleeve 88 positions washers 106 in spaced-apart relation relative to the thickness of bushing 86 so as to ensure smooth rotation of sleeve 88 and washers 106 relative to bushing 86. In this manner, a low friction pivot is formed between sleeve 88 and bushing 86 for retaining a hood (not shown) affixed to bracket 46 with a vehicle frame.

To facilitate attachment and fixturing of a hood to bracket 46, bracket 46 is formed from an arm 108 that carries a mounting plate 110 configured to fasten to the hood. Plate 110 has a plurality of slotted apertures 112 configured to receive mounting bolts that secure bracket 46 to the hood. Additionally, a slotted aperture 114 is formed in arm 108 for receiving bolt 102 in assembly. Aperture 114 is slotted so as to accommodate fore and aft adjustment when fixturing and aligning a hood carried by brackets 46 with a cab and a frame. Furthermore, bracket 46 includes a removable depending bracket 116 having a plurality of slotted apertures 118 for mounting to the hood. A pair of spaced-apart weld nuts 120 are attached to bracket 116 behind associated clearance apertures in the bracket configured to receive retaining bolts 119 and associated washers 121. The relative positions of bracket 116 and plate 112 can be adjusted by positioning bolts 119 within a desired location of slotted apertures 112, prior to tightening the bolts.

FIG. 5 illustrates hood hinge assembly 22 according to an assembled vertical cross-sectional view. Assembly 22 mounts a hood to a frame of a vehicle to provide a compliant relationship therebetween which allows at least fore-and-aft relative movement. As shown in FIG. 5, brackets 62 and 64 form a support member for mounting the hinge assembly 22 to a vehicle frame. Bolt 72 forms the pivot axis about which rocker member 66 pivotally connects to the support member, or brackets 62 and 64. Rubber isolators 68 and 70 form resilient spacer members that are disposed between the rocker member 66 and the support member brackets 62 and 64. In operation, isolators 68 and 70 impart compliance between bolt 102 and bolt 72. Bushing 86, sleeve 88, washers 106, and bolt 102 cooperate in assembly to form a pivot mount that pivotally connects arm 108 to rocker member 66. Arm 108 forms part of the hood connection bracket 46 which pivots to enable opening and closing of a hood attached thereto.

A reduced-diameter portion 122 is formed by isolator 68, extending within an oversized bore 124 in rocker member 66 to compliantly isolate member 66 from bolt 72 and brackets 62 and 64. Preferably, each isolator has a plurality of circumferentially extending trenches 126 formed about an outer-diameter portion. Trenches 126 function to form regions having enhanced compliance along the outer surface of each isolator 68 and 70. A steel compression sleeve 128 extends through an inner-diameter bore of isolators 68 and 70, between brackets 62 and 64. Sleeve 120 functions to maintain spacing between brackets 62 and 64, resulting in controlled compression with rocker member 66 via isolators 68 and 70. Compression of isolators 68 and 70 ensures firm but compliant mounting of member 66 between brackets 62 and 64.

According to FIG. 5, construction of a hinge assembly is shown having a first part, or bracket 46 mounted to a hood, and a second part, or isolator assembly 60 mounted to a vehicle frame. Bracket 46 and isolator assembly 60 are capable of compliant relative movement therebetween in at least a fore-and-aft direction. Preferably, a pair of hinge assemblies 22 are carried in laterally spaced-apart relation by a vehicle frame. The pair of hinge assemblies 22 are constructed and arranged to pivotally support the hood so as to facilitate access to an engine compartment defined at least in part below the hood.

FIG. 6 illustrates hood hinge assembly 22 according to an assembled vertical cross-sectional view taken perpendicular to that shown in FIG. 5. Namely, the pivotal mounting of bracket 46 to rocker member 66 can be readily seen. Additionally, the compliant fore-and-aft movement of bracket 46 along the axis of bolt 102 can be seen, as rocker member 66 rocks about the axis of bolt 72. Furthermore, the resilience of rubber portion 122 of isolator 68 imparts compliance between bolt 72 and rocker member 66. Such compliance also enables accommodation of yaw and roll when mounting a hood to a cab and a frame.

An additional feature of rocker member 66 is provided by the placement of heels 84 along the bottom portion of member 66. Heels 84 are configured to contact a top surface of support bracket 64, limiting the fore-and-aft pivoting of member 66. Hence, each heel provides a stop, or abutment that engages with bracket 64 to limit pivotal movement of member 66. The overall fore-and-aft movement of bolt 102 (the second pivot), resulting at least in part from rocker motion of rocker member 66, is preferably limited by contact between heels 84 and bracket 64 to a maximum of about 1.5 inches.

In addition to the advantages explained elsewhere herein, the compliant hood hinge assemblies 22 include features which facilitate easy maintenance of the vehicle, particularly when such maintenance requires removal of the hood for better access. For example, major engine work or removal of the heat exchangers positioned directly behind the hood oftentimes is facilitated by removing the hood from the vehicle. Prior hood mounting systems typically mounted the hood in such a manner that complete adjustment of the hood position and alignment might be needed if the hood was removed. This is a relatively costly maintenance procedure unto itself. Thus, mechanics frequently do not remove hoods, even though they present a serious impediment to their work.

The hinge assemblies 22 include a retainer 90 which can be easily removed by detaching fasteners 98. After the retainer is removed, the pivots including pivot bolts 102, bushings 86 and related parts along with the hood can simply be lifted from their supported position upon the yoke-shaped rocker piece 66. This allows the entire hood assembly to lifted from the front of the vehicle. Most importantly, the hood assembly can be easily reset into the same location without the need for costly realignment and adjustment. The factory-adjusted hood positioning determined by rocker piece 66 is still maintained and the hood assembly is simply repositioned thereinto and returned to an assembled condition. This greatly reduces hood reinstallation costs.

Detachable Coupling For Hood-Cab Interface

FIG. 7 illustrates the construction of a preferred detachable coupling which includes a pair of mating members 28. The detachable mating member pairs preferably form latch/guide assemblies 28 which positionally coordinate and mechanically couple the hood to the cab (as shown in FIG. 1). Latch assembly 40 is mounted to member 52 (of FIG. 2). Similarly, guide assembly 42 is mounted to cowl 16 of a vehicle cab. Latch assembly 40 forms a first mating member which is mounted to a rearward portion of a vehicle hood. Guide assembly 42 forms a second mating member which is mounted to a vehicle cab. The first and second mating members are detachable into disengaged relative positions to allow the hood is be opened and moved into engaged positions when the hood is closed. In operation, the first and the second mating members provide engagement therebetween when in the engaged relative positions to thereby position the hood relative to the cab. The pair of hinge assemblies allows the hood to move in compliant relationship relative to the vehicle frame.

Latch assembly 40 includes a pin 130 that forms a compliant male member sized to mate within guide assembly 42. A hood bracket 132 is mounted to the hood. An angle bracket 134, carrying pin 130, mounts to the hood bracket 132. To enable compliance during hood yaw and roll, pin 130 is formed from a resilient material such as polyurethane that imparts compliance to the pin as it mates with guide member 136.

Guide assembly 42 includes a guide member 136 that forms a female member sized to receive pin 130. A cowl bracket 138 mounts to cowl 16 of a vehicle cab. Guide member 136 is mounted to cowl bracket 138.

To facilitate alignment between pin 130 and guide member 136, the components of latch assembly 40 and guide assembly 42 have alignment features that enable relative alignment therebetween during assembly. A plurality of slotted apertures 140 are formed in bracket 132 enabling positioning of bracket 132 before securing it in place to a hood with bolts 142, washers 144 and nuts 146. Similarly, a pair of apertures 140 are formed in bracket 132 for securing bracket 134 to bracket 132 in relative alignment. A plurality of apertures 148 in bracket 134 receive bolts 142, washers 144 and nuts 146. Additionally, pin 130 is mounted to bracket 134 via a slotted aperture 140 with a nut 150 being received on a threaded stem 152 extending from pin 130.

An enlarged shoulder 154 formed on pin 130 limits the depth of insertion of an elongate mating portion on pin 130 within guide member 136. Additionally, shoulder 154 functions as a resilient snubber, preventing hard contact between latch assembly 40 and guide assembly 42. Hence, a limited amount of compliance is provided between assemblies 42 and 44, while essentially retaining them together in substantially non-translating relation. Such compliance enables accommodation of twisting that can occur between a hood and cowl due to yaw and roll therebetween. Additionally, guide member 136 is mounted in alignable fashion to bracket 138 by securing them together via apertures 140 and 148, bolts 142, washers 144, and nuts 146. Finally, bracket 138 is secured to cowl 16 with bolts 156 being received in alignable fashion within slotted apertures 140.

A guide bracket 158 is also mounted to cowl 16 with bolts 156, behind bracket 138. Guide bracket 158 functions to mount accessory components within the engine compartment.

Methods

Additional aspects of this invention include novel methods of mounting a hood to a frame and a cab carried by the frame. The method includes the step of mounting a rearward portion of the hood to secure the hood in engaged relative position with the cab. The method also includes the step of mounting frontal portions of the hood and frontal portions of the frame in compliant, relative movable relation therebetween in at least fore and aft directions.

The invention has been described in language more or less specific as to structural, methodological, or other aspects and features. It is to be more properly understood that the invention is not necessarily limited to the specific forms shown and described. Other equivalent structures and features may also be within the inventive concepts which are appropriately protected under the grant of patent rights being sought. The invention is therefore being claimed in an effort to define the invention but the various forms or modifications which the invention may take is difficult or impossible to define with certainty. Judgement must be utilized to properly interpret the scope of protection which is to be appropriately applied with regard to these new and inventive concepts.

I claim:

1. A vehicle hood mountable to a vehicle, the vehicle having a frame, comprising:
   a hood extending from a frontal portion to a rearward portion;
   at least one hinge assembly mounted between the frontal portion of the hood and frontal portions of the frame to permit movement of the hood relative to the frame about a hood axis between an open and a closed position;
   a spring actuator mounted between the frame and hood which exerts force to assist movement of the hood between the open and closed positions;
   a locking device positioned upon the spring actuator and operable in response to movement of the hood to lock the hood in an open position by locking the spring actuator in an open position; and
   wherein the locking device is movable to a release position to permit the hood to move from said open position to the closed position.

2. A vehicle hood according to claim 1 wherein the locking device further comprises a resetting device operable in response to movement of the hood toward the closed position to shift the locking device to a reset position for automatic operation to lock the hood in the open position responsive to a successive movement of the hood to the open hood.

3. A vehicle hood according to claim 1 wherein the locking device is manually movable to the release position.

4. A vehicle hood according to claim 1 wherein the spring actuator is extensible to an extended position and is mounted between the vehicle frame and hood to extend responsive to motion of the hood to the open position and wherein the locking device is positioned on the spring actuator to lock the spring actuator in the extended position at the open position of the hood.

5. A vehicle hood according to claim 1 wherein the spring actuator includes an actuator casing and an actuator rod slidably mounted to the actuator casing;
   wherein the locking device is comprised of:
   a lock member pivotably mounted to the actuator casing;
   a first actuator catch on the lock member pivotable with the lock handle between a locking position for locking engagement with the actuator rod to prevent longitudinal motion of the actuator rod with respect to the actuator casing;

an operator on the lock member positioned for engagement with the actuator rod to shift the actuator catch clear of the actuator rod responsive to movement of the actuator rod to the retracted position.

6. A vehicle hood according to claim 1 wherein the spring actuator includes an actuator casing and an actuator rod slidably received within the actuator casing for movement between an extended position and a retracted position responsive to movement of the hood between the open and closed positions and wherein the locking device is positioned on the spring actuator to operate in response to sliding movement of the actuator rod to the extended position to lock the actuator rod in the extended position at the open position of the hood.

7. A vehicle hood according to claim 1 wherein the spring actuator includes an elongated actuator casing having a first and a second end and an actuator rod slidably received within the actuator casing and projecting from the second end of the actuator casing; and a coil spring within the actuator casing engaging the actuator casing and actuator rod to bias the actuator rod in one direction.

8. A vehicle hood according to claim 1 wherein the spring actuator includes an elongated actuator casing having a first and a second end and an actuator rod slidably received within the actuator casing and projecting from the second end of the actuator casing;

the first end of the actuator casing being mounted to the vehicle frame at a location thereon spaced from the hood axis;

a coil spring within the actuator casing engaging the actuator casing and actuator rod to bias the actuator rod in one direction;

wherein the locking device is comprised of a lock handle pivotably mounted to the actuator casing; and a first actuator catch on the lock handle pivotable with the lock handle between a locking position for locking engagement with the actuator rod to prevent longitudinal motion of the actuator rod with respect to the actuator casing.

9. A vehicle hood according to claim 1 wherein the spring actuator includes an elongated actuator casing having a first and a second end and an actuator rod slidably received within the actuator casing and projecting from the second end of the actuator casing;

the first end of the actuator casing being mounted to the vehicle frame at a location thereon spaced from the hood axis;

a spring within the actuator casing engaging the actuator casing and actuator rod to bias the actuator rod in one direction toward a retracted position adjacent the second end of the actuator casing, the actuator rod being slidable within the actuator casing toward an extended position against yieldable resistance of the spring;

wherein the locking device is comprised of a lock handle pivotably mounted to the actuator casing; and a first actuator catch on the lock handle pivotable with the lock handle between a locking position for locking engagement with the actuator rod approximately at the extended position thereof to prevent movement of the actuator rod to the retracted position.

10. A vehicle hood according to claim 1 wherein the spring actuator includes a first end mounted to the vehicle frame at a location thereon above the hood axis and a second end mounted to the hood adjacent the rearward portion of the hood above the first end.

11. A vehicle hood according to claim 1 wherein the spring actuator is a primary spring actuator mounting the locking device and further comprising an auxiliary spring actuator mounted between the hood and vehicle frame substantially parallel to and in lateral opposition to the primary spring actuator.

12. A vehicle hood opening and closing assist spring assembly, comprising:

an elongated actuator casing having a first and a second end;

a first mounting member connected to the first end of the actuator casing;

an actuator rod slidably received within the actuator casing and projecting from the second end of the actuator casing;

a second mounting member on the actuator rod;

wherein one of the mounting members is configured for attachment to a vehicle frame and the other one of the mounting members is configured for attachment to a vehicle hood;

a single coil spring within the actuator casing, engaging the actuator rod and acting against the actuator casing to longitudinally bias the actuator rod in one direction;

the mounting members being positionable within a vehicle between a hinged vehicle hood movable on a hood axis between an open and a closed position and a vehicle frame such that the actuator rod is biased against the vehicle hood in the closed position to assist opening the hood and such that the actuator rod is biased against the vehicle hood in the open position to assist closing the hood.

13. A vehicle hood opening and closing assist spring assembly according to claim 12 and further comprising a locking device operably connected to the actuator casing to limit movement of the actuator rod relative to the actuator casing.

14. A vehicle hood opening and closing assist spring assembly according to claim 12 wherein the actuator rod is movable relative to the actuator casing between an extended position and a retracted position; and further comprising a locking device operably connected to the actuator casing to limit movement of the actuator rod at one of the extended or retracted positions.

15. A vehicle hood opening and closing assist spring assembly according to claim 12 wherein the actuator rod is movable relative to the actuator casing between an extended position and a retracted position; and further comprising a locking device operably connected to the actuator casing and positionable to a locking position to limit movement of the actuator rod at one of the extended or retracted positions; and wherein the locking device is configured to be shifted from the locking position to a release position to permit the actuator rod to move between the extended position and the retracted position.

16. A vehicle hood opening and closing assist spring assembly according to claim 12 wherein the actuator rod is movable relative to the actuator casing between an extended position and a retracted position; and further comprising a locking device operably connected to the actuator casing to limit movement of the actuator rod at one of the extended or retracted positions;

wherein the locking device is configured to be shifted to a release position to permit the actuator rod to move between the extended position and the retracted position; and wherein the locking device also includes a resetting device operable in response to movement of the hood toward the closed position to shift the locking device to a reset locking position from the release position in response to movement of the actuator rod with respect to the actuator casing.

17. A vehicle hood opening and closing assist spring assembly according to claim 12 wherein the actuator rod is movable relative to the actuator casing between an extended position and a retracted position; and further comprising:

a locking device operably connected to the actuator casing and operable responsive to movement of the actuator rod relative to the actuator casing to lock the actuator rod at the extended position.

18. A vehicle hood opening and closing assist spring assembly according to claim 12, wherein the actuator rod includes a plunger head engaging the coil spring and wherein the actuator rod passes longitudinally through the coils of the coil spring.

19. A vehicle hood opening and closing assist spring assembly according to claim 12, wherein the actuator rod is movable within the actuator casing between an extended and a retracted position relative to the actuator casing and wherein the coil spring is positioned within the actuator casing to bias the actuator rod to the retracted position.

20. A vehicle hood opening and closing assist spring assembly according to claim 12, wherein the actuator rod includes a plunger head engaging the coil spring and wherein the actuator rod passes longitudinally through the coils of the coil spring; and wherein the actuator rod is movable within the actuator casing between an extended and a retracted position relative to the actuator casing and wherein the coil spring is positioned within the actuator casing to bias the actuator rod to the retracted position.

21. A vehicle hood opening and closing assist spring assembly, comprising:

an elongated actuator casing having a first and a second end;

a first mounting member at the first end of the actuator casing an actuator rod slidably received within the actuator casing and projecting from the second end of the actuator casing;

a second mounting member on the actuator rod;

wherein one of the mounting members is configured for attachment to a vehicle frame and the other one of the mounting members is configured for attachment to a vehicle hood;

a spring within the actuator casing, engaging the actuator rod and acting against the actuator casing to longitudinally bias the actuator rod;

a locking device positioned upon the actuator casing to limit movement of the actuator rod relative to the actuator casing by locking the elongated actuator in an open position to resist spring force applied by the spring within the actuator casing.

22. A vehicle hood opening and closing assist spring assembly, according to claim 21 wherein the actuator rod is movable between an extended and a retracted position relative to the actuator casing and wherein the locking device is configured to lock the actuator rod to the casing at an extended position.

23. A vehicle hood opening and closing assist spring assembly, according to claim 21 wherein the actuator rod is movable between an extended and a retracted position relative to the actuator casing and wherein the locking device is configured to automatically lock the actuator rod to the casing in an extended position.

24. A vehicle hood opening and closing assist spring assembly, according to claim 21 wherein the locking device is configured to selectively lock the actuator rod to the casing and for manual operation to release the actuator rod for movement relative to the actuator casing.

25. A vehicle hood opening and closing assist spring assembly, according to claim 21 wherein actuator rod is movable between an extended and a retracted position relative to the actuator casing and wherein the locking device is configured to selectively lock the actuator rod in one of the extended and retracted positions and to release the actuator rod for movement relative to the actuator casing and wherein the locking device further comprises a resetting device operable in response to movement of the actuator rod to shift the locking device to a reset locking position for automatic operation to lock the actuator rod in said one of the extended and retracted positions.

26. A vehicle hood opening and closing assist spring assembly, according to claim 21 wherein the spring is positioned to yieldably urge the actuator rod to a retracted position and wherein the locking device is positioned relative to the actuator casing and actuator rod to lock the actuator rod in the extended position.

27. A vehicle hood opening and closing assist spring assembly, according to claim 21 wherein the spring is positioned to yieldably urge the actuator rod to a retracted position and wherein the locking device is configured to automatically lock the actuator rod in the extended position in response to movement of the actuator rod to the extended position.

28. A vehicle hood opening and closing assist spring assembly, according to claim 21 wherein the spring is a single coil spring within the actuator casing, engaging the actuator rod and acting against the actuator casing to longitudinally bias the actuator rod in one direction.

29. A vehicle hood opening and closing assist spring assembly, according to claim 21 wherein the locking device is mounted on the actuator casing.

30. A vehicle hood opening and closing assist spring assembly, according to claim 21 wherein the mounting members are configured to be positioned within a vehicle between a hinged vehicle hood movable on a hood axis between an open and a closed position and a vehicle frame such that the plunger and actuator rod are biased against the vehicle hood in the closed position to assist opening the hood and such that the plunger and actuator are biased against the vehicle hood in the open position to assist closing the hood.

31. A vehicle hood opening and closing assist spring assembly, comprising:

an elongated actuator casing having a first and a second end;

a first mounting member at the first end of the actuator casing an actuator rod slidably received within the actuator casing and projecting from the second end of the actuator casing;

a second mounting member on the actuator rod;

wherein one of the mounting members is configured for attachment to a vehicle frame and the other one of the mounting members is configured for attachment to a vehicle hood;

a spring within the actuator casing, engaging the actuator rod and acting against the actuator casing to longitudinally bias the actuator rod;

a locking device operably connected to the actuator casing to limit movement of the actuator rod relative to the actuator casing;

wherein the spring is positioned to yieldably urge the actuator rod to a retracted position and wherein the locking device is positioned relative to the actuator casing and actuator rod to lock the actuator rod in the extended position.

32. A vehicle hood opening and closing assist spring assembly, according to claim 31 wherein the actuator rod is movable between an extended and a retracted position relative to the actuator casing and wherein the locking device is configured to lock the actuator rod to the casing at an extended position.

33. A vehicle hood opening and closing assist spring assembly, according to claim 31 wherein the actuator rod is movable between an extended and a retracted position relative to the actuator casing and wherein the locking device is configured to automatically lock the actuator rod to the casing in an extended position.

34. A vehicle hood opening and closing assist spring assembly, according to claim 31 wherein the locking device is configured to selectively lock the actuator rod to the casing and for manual operation to release the actuator rod for movement relative to the actuator casing.

35. A vehicle hood opening and closing assist spring assembly, according to claim 31 wherein actuator rod is movable between an extended and a retracted position relative to the actuator casing and wherein the locking device is configured to selectively lock the actuator rod in one of the extended and retracted positions and to release the actuator rod for movement relative to the actuator casing and wherein the locking device further comprises a resetting device operable in response to movement of the actuator rod to shift the locking device to a reset locking position for automatic operation to lock the actuator rod in said one of the extended and retracted positions.

36. A vehicle hood opening and closing assist spring assembly, according to claim 31 wherein the locking device is configured to automatically lock the actuator rod in the extended position in response to movement of the actuator rod to the extended position.

37. A vehicle hood opening and closing assist spring assembly, according to claim 31 wherein the spring is a single coil spring within the actuator casing, engaging the actuator rod and acting against the actuator casing to longitudinally bias the actuator rod in one direction.

38. A vehicle hood opening and closing assist spring assembly, according to claim 31 wherein the locking device is mounted on the actuator casing.

39. A vehicle hood opening and closing assist spring assembly, according to claim 31 wherein the mounting members are configured to be positioned within a vehicle between a hinged vehicle hood movable on a hood axis between an open and a closed position and a vehicle frame such that the plunger and actuator rod are biased against the vehicle hood in the closed position to assist opening the hood and such that the plunger and actuator are biased against the vehicle hood in the open position to assist closing the hood.

40. A vehicle hood opening and closing assist spring assembly, comprising:
 an elongated actuator casing having a first and a second end;
 a first mounting member at the first end of the actuator casing
 an actuator rod slidably received within the actuator casing and projecting from the second end of the actuator casing;
 a second mounting member on the actuator rod;
 wherein one of the mounting members is configured for attachment to a vehicle frame and the other one of the mounting members is configured for attachment to a vehicle hood;
 a spring within the actuator casing, engaging the actuator rod and acting against the actuator casing to longitudinally bias the actuator rod;
 a locking device mounted on the actuator casing to limit movement of the actuator rod relative to the actuator casing.

41. A vehicle hood opening and closing assist spring assembly, according to claim 40 wherein the actuator rod is movable between an extended and a retracted position relative to the actuator casing and wherein the locking device is configured to lock the actuator rod to the casing at an extended position.

42. A vehicle hood opening and closing assist spring assembly, according to claim 40 wherein the actuator rod is movable between an extended and a retracted position relative to the actuator casing and wherein the locking device is configured to automatically lock the actuator rod to the casing in an extended position.

43. A vehicle hood opening and closing assist spring assembly, according to claim 40 wherein the locking device is configured to selectively lock the actuator rod to the casing and for manual operation to release the actuator rod for movement relative to the actuator casing.

44. A vehicle hood opening and closing assist spring assembly, according to claim 40 wherein actuator rod is movable between an extended and a retracted position relative to the actuator casing and wherein the locking device is configured to selectively lock the actuator rod in one of the extended and retracted positions and to release the actuator rod for movement relative to the actuator casing and wherein the locking device further comprises a resetting device operable in response to movement of the actuator rod to shift the locking device to a reset locking position for automatic operation to lock the actuator rod in said one of the extended and retracted positions.

45. A vehicle hood opening and closing assist spring assembly, according to claim 40 wherein the locking device is configured to automatically lock the actuator rod in the extended position in response to movement of the actuator rod to the extended position.

46. A vehicle hood opening and closing assist spring assembly, according to claim 40 wherein the spring is a single coil spring within the actuator casing, engaging the actuator rod and acting against the actuator casing to longitudinally bias the actuator rod in one direction.

47. A vehicle hood opening and closing assist spring assembly, according to claim 40 wherein the mounting members are configured to be positioned within a vehicle between a hinged vehicle hood movable on a hood axis between an open and a closed position and a vehicle frame such that the plunger and actuator rod are biased against the vehicle hood in the closed position to assist opening the hood and such that the plunger and actuator are biased against the vehicle hood in the open position to assist closing the hood.

48. A vehicle hood opening and closing assist spring assembly, comprising:
 an elongated actuator casing having a first and a second end;
 a first mounting member at the first end of the actuator casing
 an actuator rod slidably received within the actuator casing and projecting from the second end of the actuator casing;

a second mounting member on the actuator rod;

wherein one of the mounting members is configured for attachment to a vehicle frame and the other one of the mounting members is configured for attachment to a vehicle hood;

a spring within the actuator casing, engaging the actuator rod and acting against the actuator casing to longitudinally bias the actuator rod;

a locking device operably connected to the actuator casing to limit movement of the actuator rod relative to the actuator casing;

wherein the mounting members are configured to be positioned within a vehicle between a hinged vehicle hood movable on a hood axis between an open and a closed position and a vehicle frame such that the plunger and actuator rod are biased against the vehicle hood in the closed position to assist opening the hood and such that the plunger and actuator are biased against the vehicle hood in the open position to assist closing the hood.

49. A vehicle hood and assist spring assembly, comprising:

a vehicle hood mounted upon a vehicle frame for pivotal action thereon;

an actuator having:
an actuator casing having a first and a second end;
an actuator rod slidably received within the actuator casing and projecting from the actuator casing;
a first mount on one end of the actuator and a second mount on another end of the actuator;
a single coil spring within the actuator casing, engaging the actuator rod and acting against the actuator casing to longitudinally bias the actuator rod in one direction relative to the actuator casing;

wherein said actuator rod is biased against the vehicle hood in the closed position to assist opening the hood and such that the actuator rod is biased against the vehicle hood in the open position to assist closing the hood.

50. A vehicle hood and assist spring assembly according to claim 49 and further comprising a locking device operably connected to the actuator casing to limit movement of the actuator rod relative to the actuator casing.

51. A vehicle hood and assist spring assembly according to claim 49 wherein the actuator rod is movable relative to the actuator casing between an extended position and a retracted position; and further comprising a locking device operably connected to the actuator casing to limit movement of the actuator rod at one of the extended or retracted positions.

52. A vehicle hood and assist spring assembly according to claim 49 wherein the actuator rod is movable relative to the actuator casing between an extended position and a retracted position; and further comprising a locking device operably connected to the actuator casing and positionable to a locking position to limit movement of the actuator rod at one of the extended or retracted positions; and wherein the locking device is configured to be shifted from the locking position to a release position to permit the actuator rod to move between the extended position and the retracted position.

53. A vehicle hood and assist spring assembly according to claim 49 wherein the actuator rod is movable relative to the actuator casing between an extended position and a retracted position; and further comprising a locking device operably connected to the actuator casing to limit movement of the actuator rod at one of the extended or retracted positions;

wherein the locking device is configured to be shifted to a release position to permit the actuator rod to move between the extended position and the retracted position; and wherein the locking device also includes a resetting device operable in response to movement of the hood toward the closed position to shift the locking device to a reset locking position from the release position in response to movement of the actuator rod with respect to the actuator casing.

54. A vehicle hood and assist spring assembly according to claim 49 wherein the actuator rod is movable relative to the actuator casing between an extended position and a retracted position; and further comprising:

a locking device operably connected to the actuator casing and operable responsive to movement of the actuator rod relative to the actuator casing to lock the actuator rod at the extended position.

55. A vehicle hood and assist spring assembly according to claim 49, wherein the actuator rod includes a plunger head engaging the coil spring and wherein the actuator rod passes longitudinally through the coils of the coil spring.

56. A vehicle hood and assist spring assembly according to claim 49, wherein the actuator rod is movable within the actuator casing between an extended and a retracted position relative to the actuator casing and wherein the coil spring is positioned within the actuator casing to bias the actuator rod to the retracted position.

57. A vehicle hood and assist spring assembly according to claim 49, wherein the actuator rod includes a plunger head engaging the coil spring and wherein the actuator rod passes longitudinally through the coils of the coil spring; and wherein the actuator rod is movable within the actuator casing between an extended and a retracted position relative to the actuator casing and wherein the coil spring is positioned within the actuator casing to bias the actuator rod to the retracted position.

* * * * *

UNITED STATES PATENT AND TRADEMARK OFFICE
CERTIFICATE OF CORRECTION

PATENT NO.    : 5,975,228

DATED         : November 2, 1999

INVENTOR(S)   : Laurence S. Parfitt

It is certified that error appears in the above-identified patent and that said Letters Patent is hereby corrected as shown below:

Column 18, line 47, delete [hood] and insert - - position - - .

Signed and Sealed this

Seventeenth Day of October, 2000

Attest:

Q. TODD DICKINSON

*Attesting Officer*　　　　　*Director of Patents and Trademarks*